United States Patent
Kim

(10) Patent No.: US 9,350,941 B2
(45) Date of Patent: May 24, 2016

(54) METHOD FOR CONNECTING VIDEO COMMUNICATION TO OTHER DEVICE, VIDEO COMMUNICATION APPARATUS AND DISPLAY APPARATUS THEREOF

(75) Inventor: Minhyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 443 days.

(21) Appl. No.: 12/982,773

(22) Filed: Dec. 30, 2010

(65) Prior Publication Data
US 2011/0164106 A1    Jul. 7, 2011

(30) Foreign Application Priority Data
Jan. 5, 2010 (KR) .......................... 10-2010-000555

(51) Int. Cl.
| | |
|---|---|
| H04N 7/14 | (2006.01) |
| H04N 21/41 | (2011.01) |
| H04N 21/436 | (2011.01) |
| H04N 21/4788 | (2011.01) |
| H04L 29/06 | (2006.01) |

(52) U.S. Cl.
CPC ............ *H04N 7/147* (2013.01); *H04L 65/1093* (2013.01); *H04L 65/4076* (2013.01); *H04L 65/4084* (2013.01); *H04N 7/142* (2013.01); *H04N 21/4104* (2013.01); *H04N 21/43615* (2013.01); *H04N 21/4788* (2013.01)

(58) Field of Classification Search
USPC .......... 348/14.01, 14.08, 14.03, 14.07, 14.09, 348/14.1, 333.02
See application file for complete search history.

(56) References Cited

U.S. PATENT DOCUMENTS

| | | | | |
|---|---|---|---|---|
| 5,444,477 | A  * | 8/1995 | Yamadera et al. | ......... 348/14.07 |
| 6,181,366 | B1 | 1/2001 | Dezonno et al. | |
| 7,013,003 | B2 * | 3/2006 | Seligmann | .......... H04L 12/5692 |
| | | | | 379/211.02 |
| 7,477,282 | B2 * | 1/2009 | Firestone et al. | ......... 348/14.09 |
| 7,679,640 | B2 * | 3/2010 | Eshkoli et al. | ............. 348/14.09 |
| 7,693,190 | B2 * | 4/2010 | Firestone et al. | ............. 370/503 |
| 8,798,609 | B2 * | 8/2014 | Jeon | .................... G06F 3/04817 |
| | | | | 379/88.11 |
| 2005/0122963 | A1 | 6/2005 | Jeon et al. | |
| 2006/0179451 | A1* | 8/2006 | Sung | ............................... 725/12 |
| 2008/0117937 | A1 | 5/2008 | Firestone et al. | |
| 2009/0069038 | A1* | 3/2009 | Olague et al. | ................. 455/466 |
| 2010/0316201 | A1* | 12/2010 | Miller | ............... H04M 3/42314 |
| | | | | 379/93.01 |

FOREIGN PATENT DOCUMENTS

| | | | |
|---|---|---|---|
| JP | 2005295205 A | * | 10/2005 |
| KR | 1020090016289 | * | 2/2009 |
| WO | WO 2006/058036 A2 | | 6/2006 |
| WO | WO 2007/119901 A1 | | 10/2007 |

* cited by examiner

*Primary Examiner* — Yosef K Laekemariam
(74) *Attorney, Agent, or Firm* — Birch, Stewart, Kolasch & Birch, LLP

(57) ABSTRACT

The present invention relates to a method of switching video communication received from a video communication apparatus to an external device, which can include receiving a video communication; receiving a request for switching the received video communication to a first external device, and transmitting at least one of audio and video) data according to the video communication to the first external device.

13 Claims, 24 Drawing Sheets

METHOD FOR CONNECTING VIDEO COMMUNICATION TO OTHER DEVICE, VIDEO COMMUNICATION APPARATUS AND DISPLAY APPARATUS THEREOF

The present application claims priority benefits of Korean Patent Application No. 10-2010-0000555 filed on Jan. 5, 2010 in Republic of Korea, the entire contents of which are fully incorporated by reference.

BACKGROUND OF THE INVENTION

1. Field of the Invention

An embodiment relates to a method of connecting video communication in a video communication apparatus.

2. Description of the Conventional Art

As a digital TV technology based on the digital technology has been developed and commercialized, it is possible to provide users with a variety of contents services, such as real-time broadcasting, COD (Contents on Demand), games, news, video call, by using the internet network provided in each home, other than the existing radio media.

An IPTV (Internet Protocol TV) can be an example of the contents services provided through the internet network. The IPTV is to transmit and provide various information services, video contents, and broadcasting to televisions of users, using the high-speed internet network.

SUMMARY OF THE INVENTION

Embodiments provide a method of switching received video communication to an external device, a video communication apparatus using the method, and a display apparatus.

An embodiment provides a method for switching video communication from a display apparatus that can make video communication to an external device, which includes: receiving video communication; receiving a request for switching the received video communication to a first external device; and transmitting AV (Audio and Video) data according to the video communication to the first external device.

Another embodiment provides a method of switching video communication received to a display apparatus, which includes: receiving a request for connecting a network for transmitting/receiving data from the display apparatus; configuring connection with the display apparatus; receiving AV data according to the video communication from the display apparatus; receiving a request for switching the video communication; and playing the received AV data, after the request for switching is received.

Another embodiment provides a video communication apparatus that switches received video communication to an external device, and includes: a first communication unit receiving video communication; a second communication unit transmitting AV data according to the video communication to the first external device, in response to a request for switching the video communication to the first external device; and a controller controlling the second communication unit to configure network connection with the first external device for transmitting/receiving data, before the switching is requested.

Another embodiment provides a display apparatus including the video communication apparatus.

Meanwhile, the methods of connecting to a video call can be implemented by computer-readable media where a program executed by a computer is recorded.

An embodiment provides a method for switching video communication from a digital TV (DTV) that can perform a video call operation to an external device, the method comprising: receiving, by the DTV, a request for a video call operation with the DTV; determining, by the DTV, if a request is received for switching to perform the video call operation with a first external device; and transmitting, by the DTV, at least one of audio data and video data of the video call operation to the first external device based on the determination result.

An embodiment provides a digital TV (DTV) for switching video communication to an external device, the DTV comprising: a communication unit configured to receive a request for a video call operation with the DTV; a user interface configured to receive a request for switching to perform the video call operation with a first external device; and a controller configured to determine if the request is received for switching to perform the video call operation with a first external device, and to control the communication unit to transmit at least one of audio data and video data of the video call operation to the first external device based on the determination result.

BRIEF DESCRIPTION OF THE DRAWING

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Hereinafter, a method for connecting video communication to other device(s) according to embodiments of the present invention, a video communication apparatus, and a display apparatus thereof according to embodiments of the present invention are described in detail with reference to the accompanying drawings.

Figure 1:
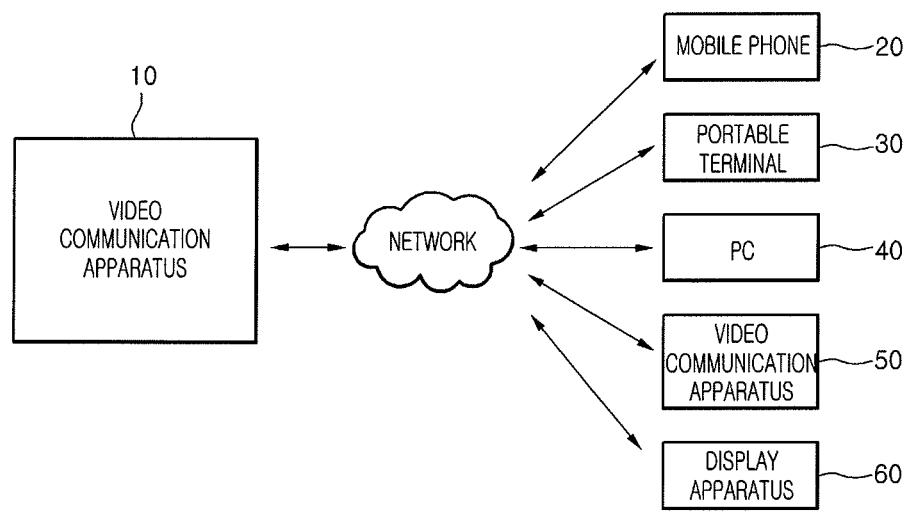
FIG. 1 is a block diagram illustrating the configuration of a video communication system according to an embodiment of the present invention.

FIG. 1 is a block diagram illustrating the configuration of a video call system.

Referring to FIG. 1, the video communication system is a system that allows a calling party and a called party to have a conversation while watching a video transmitted from the counterparts, using a plurality of devices that can process and transmit/receive video data and voice/audio data.

For example, the video communication system can include a video communication apparatus 10 and one or more devices 20 to 60 configured to communicate with the video communication apparatus 10 via network(s). All the components of the system are operatively coupled and configured.

The video communication apparatus 10 can acquire video/voice data corresponding to the user's video/voice, using: input devices, such as a camera and a microphone, and transmit the acquired video/voice data to other devices 20 to 60 connected by the wire/wireless networks. Meanwhile, the video communication apparatus 10 can receive video/voice data from the external devices 20 to 60 connected by wire/wireless networks, and accordingly, video communication is possible between the video communication apparatus 10 and the other devices 20 to 60. The video communication can include, e.g., video conferences, video calls, etc.

As shown in FIG. 1, an external device that can make the video communication with the video communication apparatus 10 may be a mobile phone 20, a mobile/portable terminal 30, such as a PDA, a navigation device or a notebook computer, a PC 40, another video communication apparatus 50, and a display apparatus 60. Further, the video communication apparatus 10 or 50 may be a digital TV, a mobile terminal, a mobile phone, a PDA, a notebook computer, a PC, a navigation apparatus, etc.

Further, the network connecting the video communication apparatus 10 with the external devices 20 to 60 allows for transmission and reception of video/voice data according to the communication standard for video communication. Here, the video/voice data or video/audio data includes at least one of video data and audio/voice data. The video data can be any type of data such as still images, moving videos, pictures, thumbnails, etc.

For example, the video communication apparatus 10 and the external devices 20 to 60 can transmit/receive video/voice data, using a network according to Ethernet or IEEE 802.3, or can transmit/receive the video/voice data, using a wireless network according to IEEE 802.11.

Meanwhile, the network allows for data transmission and reception between the video communication apparatus 10 and the external devices 20 to 60, by using a VoBB (voice over broadband) or a legacy service. To be more specific, the VoBB may include a service, such as VoCM(voice over cable modem), VoDSL(voice over DSL), VoIP(voice over Internet protocol), FWA(fixed wireless access), FTTH(fiber to the home), or VoATM(voice over ATM).

On the other hand, the legacy service may include ISDN (integrated service digital network), POTS(plain old telephone service), cellular or 3G service, etc.

Therefore, the video communication apparatus 10 and the external devices 20 to 60 can transmit/receive video/voice data, using data networks, such as a wireless network, the existing telephone network, and internet, a cable modem system, or a cellular network etc.

The video communication apparatus 10 and the external devices 20 to 60 can transmit/receive video/voice data under the rules set therebetween, and for example, may use protocols, such as H.261 standard for coding video data, H.211 standard for video/voice data communication, and H.242 standard for call setting and cancel. In detail, protocols implemented from video communication standards, such as H.323, H.263, and H264 standards for video coding and G723.1, G711, and G729 for voice coding may be used for a video communication system using internet. Further, the video communication apparatus 10 may communicate with multiple devices 20 to 60 simultaneously, and the devices 20 to 60 may communicate with each other.

The video communication system according to an embodiment of the present invention, however, is not limited to the configurations described above. For example, the devices 20 to 60 making a video communication with the video communication apparatus 10 are not limited to the devices 20 to 60 shown in FIG. 1, and standards, such as SIP, RTP/RTCP protocols, other than the standards described above, may be used.

Figure 2:
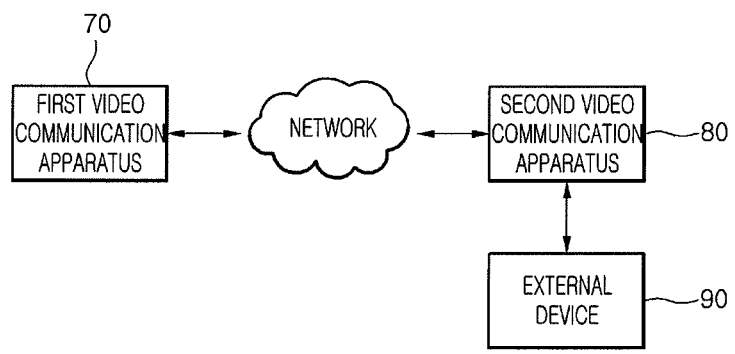
FIG. 2 is a block diagram illustrating the configuration of a video communication system according to an embodiment of the present invention.

FIG. 2 is a block diagram illustrating the configuration of a video communication system according to an embodiment of the present invention, in which the same description in the configuration of the system as that provided with reference to FIG. 1 is not provided below. The system of FIG. 2 includes a first video communication apparatus 70 and a second video communication apparatus 80 configured to communicate with each other through network(s) for video call operations and other operations, and an external device 90 configured to communicate with the second video communication apparatus 80. All components of the system of FIG. 2 are operatively coupled and configured.

Referring to FIG. 2, the second video communication apparatus 80 is the user's video communication apparatus and the first video communication apparatus 70 may be a counterpart's video communication apparatus. Here, the counterpart preferably refers to the other party (or parties)

involved in the video communication with the user of the second video communication apparatus 80.

Meanwhile, the external device 90 is another device that can make video communication, and according to an embodiment of the present invention, the external device 90 can receive video communication switched from between the first video communication apparatus 70 and the second video communication apparatus 80.

For example, the second video communication apparatus 80 can switch the video communication received from the first video communication apparatus 70 to the external device 90, in accordance with a user's request, such that the user at the external device 90 can perform the video communication with the counterpart of the first video communication apparatus 70.

In more detail, the second video communication apparatus 80 can be requested for switching the video communication to the external device 90, configure the connection for transmitting/receiving data to/from the external device 90 in accordance with the request, and transmit/receive the user's video/voice data and the counterpart's video/voice data to/from the external device 90, using the configured connection.

The first video communication apparatus 70, the second video communication apparatus 80, and the external device 90, as described with reference to FIG. 1, may be various devices that can make video communication, such as a digital TV, a mobile phone, a PDA or a notebook computer, a PC or a display apparatus. Further, the second video communication apparatus 80 can be the video communication apparatus 10 of FIG. 1, the first video communication apparatus 70 can be any of the devices 20 to 60 of FIG. 1, and the external device 90 can be any of the devices 20 to 60 configured to communicate with the second video communication apparatus 80. Communication between the second video communication apparatus 80 and the external device 90 can be carried out via a wired connection, a short-range communication, a near-field communication, Bluetooth communication, a wireless communication, a network communication, etc.

Figure 3:
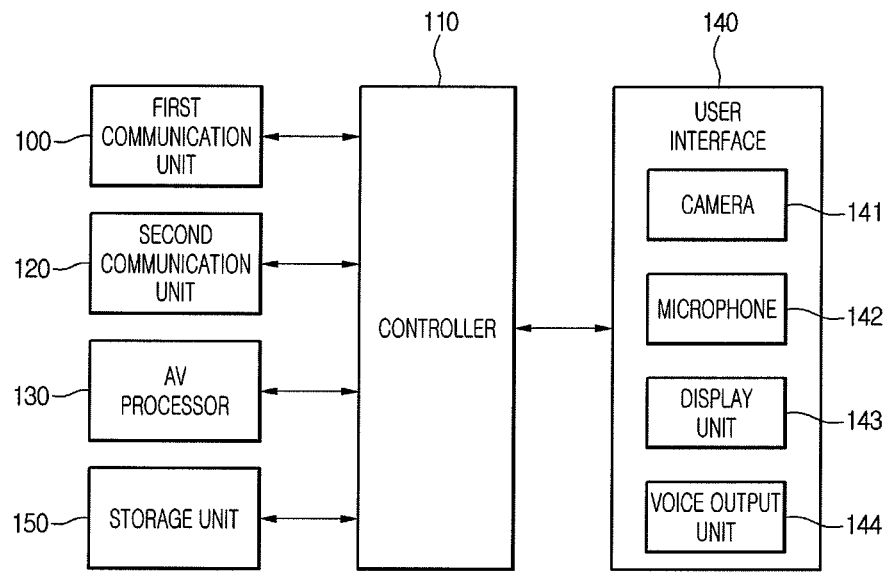
FIG. 3 is a block diagram illustrating the configuration of a video communication according to an embodiment of the present invention.

FIG. 3 is a block diagram illustrating the configuration of a video communication apparatus according to an embodiment of the present invention, in which the video communication apparatus may include a first communication unit 100, a controller 110, a second communication unit 120, an AV processor 140, a user interface 140, and a storage unit 150. All the components of the video communication apparatus of FIG. 3 are operatively coupled and configured.

Hereinafter, the operation of the video communication apparatus according to an embodiment of the present invention is described by assuming for the sake of an example that the second video communication apparatus 80 of the user shown in FIG. 2 has the same configuration of the video communication apparatus shown in FIG. 3. Further, the first video communication apparatus 70 and the external device 90 may have all or some of the components of the apparatus of FIG. 3.

Referring to FIG. 3, the first communication unit 100 of the second video communication apparatus 80 can transmit a transmission stream including AV (audio and video) data including a user's video/voice to an external device, for example, the counterpart's first video communication apparatus 70, through a wire/wireless network.

Further, the first communication unit 100 can also receive a reception stream including AV data corresponding to the counterpart's video/voice in the video communication, from the first video communication apparatus 70.

In detail, the first communication unit 100 is connected with the first video communication apparatus 70 by Ethernet or wire/wireless network, such as IEEE 802.3, IEEE 802.11 and can transmit/receive AV data according to a video call with the first video communication apparatus 70.

The second communication unit 120 can be connected with the external device 90 by a wire/wireless network and transmit/receive the AV data to/from the external device 90 through the wire/wireless network, when it is requested to switch the video communication.

For example, the second communication unit 120 of the second communication apparatus 80 and the external device 90 can transmit/receive the AV data, using wireless communication standards, such as WiHD (Wireless HD), WHDi (Wireless Home Digital Interface) or WiFi (Wireless Lan).

In more detail, as it is requested to switch the video communication to the external device 90, the second communication unit 120 can transmit AV data corresponding to the counterpart's video/voice which are received from the first video communication apparatus 70 to the external device 90, while it can receive AV data corresponding to the user's video/voice from the external device 90.

Meanwhile, the AV data of the user received from the external device 90 can be transmitted to the first video communication apparatus 70 through the first communication unit 100.

For instance, when the second video communication apparatus 80 receives, from a counterpart (the other party) at the first video communication apparatus 70, a video communication call directed to a user of the second video communication apparatus 80, the second video communication apparatus 80 can route the video communication call to the external device 90. Such a routing operation may be set up by the user so that when the user is not at the second video communication apparatus 80 but is at the external device 90, the user can still receive the video communication call from the other party using the external device 80. During the video call, the user at the external device 80 can send the user's video/audio data to the other party's apparatus 70 through the second video communication apparatus 80. In this manner, the user can be mobile without missing any video communications.

Although the configuration of the video communication apparatus according to an embodiment of the present invention has been described by exemplifying when the first and second communication units 100, 120 are separately implemented, the first and second communication units 100, 120 may be implemented by one communication module.

The AV processor 130 can output video data converted in a video stream of a predetermined format by processing the , and can also output voice/audio data converted into a voice stream of a predetermined format by processing the audio data of the user's voice.

For example, AV processor 130 can encode the video data in accordance with the standards, such as H.323, H.263, and H.264, and output an elementary stream type of video stream, which is the basis stream of digital data. Further, the AV processor 130 can encode the voice data in accordance with the standards, such as G.723.1, G.711, and G.729, and output an elementary stream type of voice stream.

The AV processor 130, in addition to the encoding described above, may perform pre-processes for improving or adjusting the quality of video to fit to a specific object, such as readjusting brightness, removing noise, smoothing, and sharpening images.

The user interface 140 performs input/output of information on the user and other information, and may include a camera 141, a microphone 142, a display unit 143, and a voice output unit 144.

The camera 141 takes pictures of the area around the video communication apparatus, e.g., the area including the user (e.g., face area of the user), and can acquire and output video data corresponding to the picture.

Meanwhile, the camera 141 may be attached to a side of the main body of the video communication apparatus, such as a Web Cam, and thus may be arranged to take a picture of the front area of the video communication apparatus. The camera 141 may be a separate device connected to the apparatus 80 or may be built-into the apparatus 80.

The microphone 142 collects sounds including voice generated around the video communication apparatus, e.g., the user's voice, and can output voice data corresponding to the sounds. The microphone 142 may be attached to one side of the main body of the video communication apparatus or disposed outside the video communication apparatus, for example, adjacent to the user. The microphone 142 may be a separate device or may be built-in to the apparatus 80.

The display unit 142 displays the user's video acquired by the camera 141, e.g., video that is transmitted to the first video communication apparatus 70, and can also display the counterpart's video received through the first communication unit 100, e.g., video transmitted from the first video communication apparatus 70 such as an image of the counterpart at the first apparatus 70. For example, the display unit 143 can display videos, using various types of display panels, such as a DLP (Digital Light Processing), an LCD (Liquid Crystal Display), and PDP (Plasma Display Panel).

Further, the voice output unit 144 outputs the user's voice acquired by the microphone 142, e.g., voice of the user, to transmit to the first video communication apparatus 70, and can also output and transmit the counterpart's voice received through the first communication unit 100, e.g., the voice transmitted from the first video communication apparatus 70, to the user of the second video communication apparatus 80.

The storage unit 150 can store data and programs for the operations of the video communication apparatus or the user's information, etc. The storage unit 150 can include a memory and/or removable storage device.

The controller 110 can control the entire operation of the video communication apparatus 80, as described above, by respectively controlling the first communication unit 100, the second communication unit 120, the AV processor 130, the user interface 140, and the storage unit 150.

Hereafter, a method of connecting video communication according to an embodiment of the present invention is described in detail with reference to FIGS. 4 to 16. The method in this embodiment or other embodiment may be implemented in any system/apparatus discussed in this or other embodiment of the invention.

Figure 4:
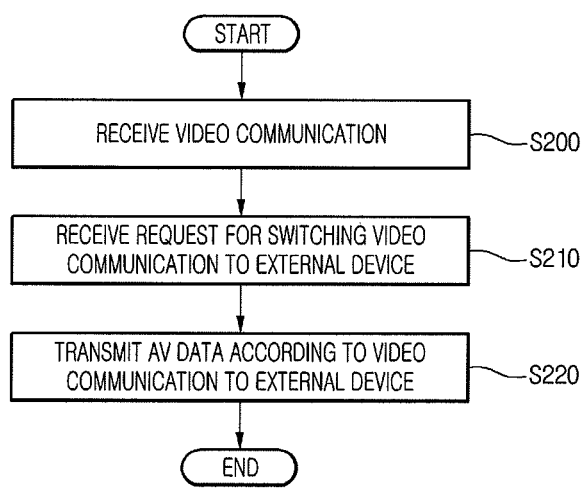
FIG. 4 is a flowchart illustrating a method for connecting video communication according to a first embodiment of the present invention.

FIG. 4 is a flowchart showing a method for connecting video communication according to a first exemplary embodiment of the present invention, and the method for connecting video communication is described in connection with the block diagram shown in FIGS. 2 and 3.

Referring to FIG. 4, the first communication unit 100 of the second video communication apparatus 80 receives video communication from the first video communication apparatus 70 (step 200).

Thereafter, the second communication unit 120 receives a request to switch the video communication to the external device 90 (step 210). For example, the user can request switching the video communication device while the second video communication is connected, e.g., before the second video communication apparatus 80 is connected to the video communication and responds the call, in which it is possible to directly respond to the received video communication, using the external device 90. For instance, the user can request that the video communication with the first communication apparatus 70 be carried out with the external device 90, instead of the second video communication apparatus 80.

Unlikely, the user can request switching the video communication device while being on the line, e.g., after the second video communication apparatus 80 is connected and responds to the received video communication, in which the received video communication can be switched to and responded by the external device 90.

Meanwhile, the second communication apparatus 80 may be a display apparatus and may be a digital TV in the living room of the user and the external device 90 may be a portable terminal of the user. In this case, the user receives video communication from the other party through the digital TV in the living room and can request to route the received video communication to his/her portable terminal.

The switching of the video communication implies switching the video communication received by the second video communication apparatus 80 to another communication apparatus, e.g., the external device 90 such that the user can take the received video communication with the external device 90. The user can set this switching at the second video communication apparatus 80 or at the external device 90.

For instance, in step 210, the user can request switching the video communication device to the external device 90, by using the second video communication apparatus 80, or can request switching the video communication by using the external device 90, which is the desired video communication device of the user.

The second communication unit 120 of the second video communication apparatus 80 transmits or routes at least one of audio and video data of the video communication from the first video communication apparatus 70 to the external device 90 in response to the request for switching the video communication (step 220).

For example, the second communication unit 120 can configure the network connection for transmitting/receiving data to/from the external device 90 by control of the controller 110, and can transmit/receive the AV data according to the video communication to/from the external device 90 using the connected network.

For instance, the second communication unit 120 can allow the user to view and listen to the counterpart's video/voice at the external device 90 by transferring the AV data received from the video communication apparatus of the counterpart, that is, the first video communication apparatus 70.

Meanwhile, the second communication unit 120 receives the AV data of the user's video/voice from the external device 90, and the first communication unit 100 can transmit the AV data received from the external device 90 to the first video communication apparatus 70. Accordingly, the counterpart can view and listen to the user's video/voice and thus the video communication (e.g., video call, video conference, etc.) can be carried out between the user at the external device 90 and the counterpart (other party) at the first video communication apparatus 70.

Figure 5:
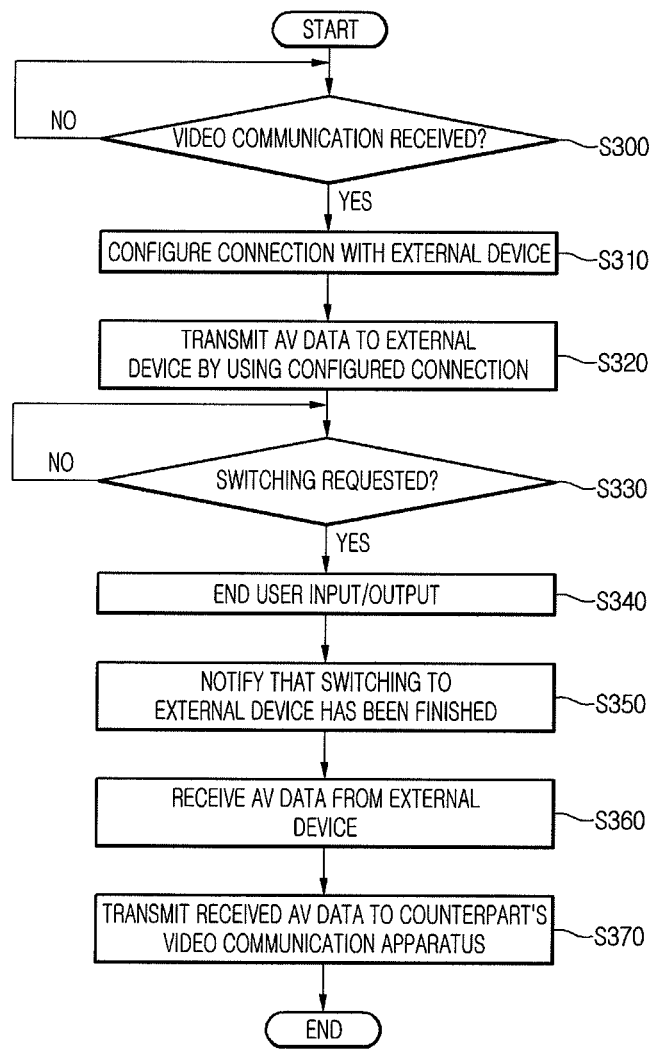
FIG. 5 is a flowchart illustrating a method for connecting video communication according to a second embodiment of the present invention.

FIG. 5 is a flowchart illustrating a method of connecting video communication according to a second embodiment of the present invention and, in the method illustrated in FIG. 5, the same portions as those described in connection with FIGS. 2 and 4 may not be repeated below.

Referring to FIG. 5, when a video communication is received from the counterpart (step 300), the second communication unit 120 of the second video communication apparatus 80 configures the connection with the external device 90 (step 310) and transmits at least one of the AV data according to the video communication to the external device 90, using the configured connection (step 320).

For example, the controller 110 can control the second communication unit 120 such that the network connection for transmitting/receiving the AV data to/from the external device 90 can be configured, when the video communication is received even before it is requested to switch the video communication to the external device 90.

Meanwhile, the step of configuring the connection with the external device 90 may include a step of requesting a connection to the external device 90 from the second communication unit 120 and a step of asking for approval of the requested connection from the external device 90. Further, the controller 110 can control the second communication unit 120 to transmit the AV data received from the first video communication apparatus 70 of the counterpart to the external device 90, using the configured network connection.

As described above, it is possible to rapidly switch the video communication to the external device upon receiving the request for switching, by configuration the connection with the external device 90 in advance before the user requests for switching of the video communication and by transmitting the AV data received from the first video communication apparatus 70 to the external device 90, such that it is possible to provide the video communication service without disconnection, delay or interruption.

As a variation, the external device 90 may not play or reproduce the received AV data, before the video communication device switching is requested. For instance, the external device 90 only receives the AV data from the second video communication apparatus 80, not reproduce the AV data, before the user requests switching of the video communication to the external device 90, such that the user may not watch and listen to the counterpart's video/voice with the external device 90 before the user's video communication switching request.

Meanwhile, the switching of video communication may be possible only for the external device 90 registered in advance in the second video communication apparatus 80. For instance, the external device 90 may need to registered with the second video communication apparatus 80 before the switching request, and as a result, the second video communication apparatus 80 can allow the video communication to be switched from the apparatus 80 to the registered external device 90.

After the connection with the external device 90 is configured as described above, the controller 110 ascertains whether there is a request for switching the video communication to the external device 90 (step 330).

The second communication unit 120 can continue with transmitting the AV data received from the first video communication apparatus 70 to the external device 90 by using the configured connection, even before the user requests switching of the video communication.

Meanwhile, when the switching of the video communication is requested, the controller 110 ends the user input/output at the second video communication apparatus 80(step 340). For instance, in step 340, the second apparatus 80 may no longer receive any input from the user directly to the second apparatus 80, and may no longer output the AV data of the video communication to the display unit of the second apparatus 80.

When the user requests switching of the video communication to the external device 90, the second video communication apparatus 80, in more detail, the display unit 143 of the second video communication apparatus 80 can display information that the video communication is requested to be switched to the external device 90 on a screen 81 of the display unit 143.

Figure 6:
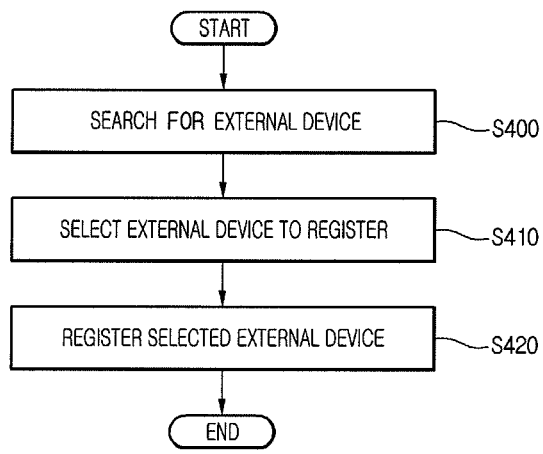
FIG. 6 is a flowchart showing an embodiment of a method of registering an external device.

FIG. 6 is a flowchart showing an embodiment of a method for registering external devices. This method can be performed in advance so that the switching to the external device 90 may be allowed. For instance, in this method the second communication unit 120 of the second video communication apparatus 80 searches for connectable peripheral external devices (step 400). For example, the controller 110 can control the second communication unit 120 to search for possible external devices that can be connected in wire/wireless networks with the second apparatus 80 through multicasting or broadcasting of periodical search signals.

For instance, the second video communication apparatus 80 sends out a search signal including its own address information in multicasting or broadcasting and the external device 90 receiving the search signal can respond by transmitting a signal including its own address information.

Then, among the searched connectable external devices, the user may select one or more external devices so that those external devices can be registered in the second apparatus 80 or server (step 410). Then, the controller 110 registers the selected external device (step 420) with the second apparatus 80 or with the server associated with the second apparatus 80. Further, the user can directly specify the external device to be registered, by directly inputting the address of the external device 90 to be registered through the second video communication apparatus 80.

In the step of registering the external device, the second video communication apparatus 80 can request device information from the external device 90 and the external device 90 can transmit the device information to the second video communication apparatus 80 in response to the request. Further, the second video communication apparatus 80 transmits configuration information to the external device 90 and the external device 90 can select a configuration relating to connection in accordance with the configuration information. For example, the device information of the external device 90 can include information such as AV codec, buffer size, and data bit rate, and the configuration information can be preferably information on the available configuration relating to the connection with the second video communication apparatus 80, and for example, may include priority, whether there is only voice, and whether to permit multi-connection, etc.

Further, the controller 110 can store the register-related items of the external device 90, as described above, in the storage unit 150.

Meanwhile, the external device 90 may be unregistered (e.g., removed from the registry) by a user's request through the second video communication apparatus 80 and the external device 90, and accordingly, the register-related items of the external device 90 stored in the storage unit 150 may be deleted.

Figure 7A:
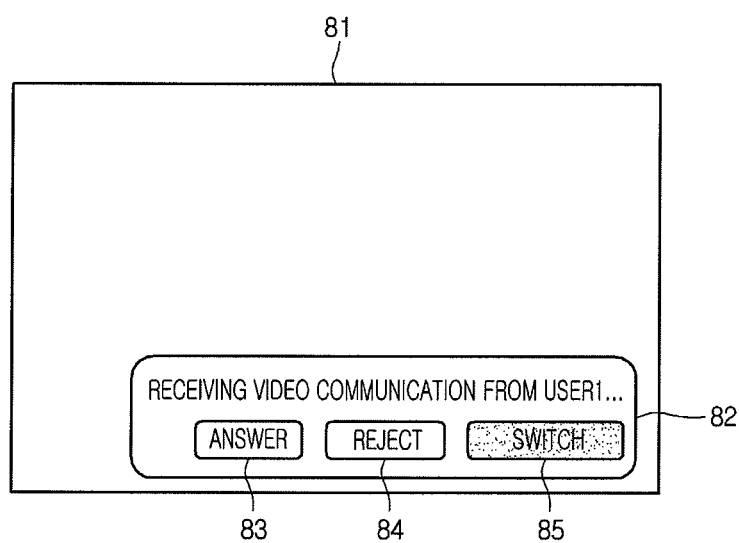
FIGS. 7A to 8 are diagrams illustrating embodiments of a method of switching video communication to an external device.
Figure 7B:
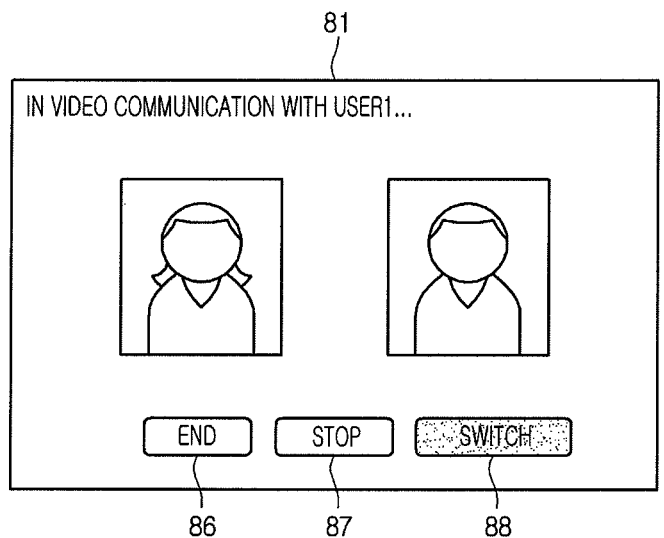
Figure 7C:
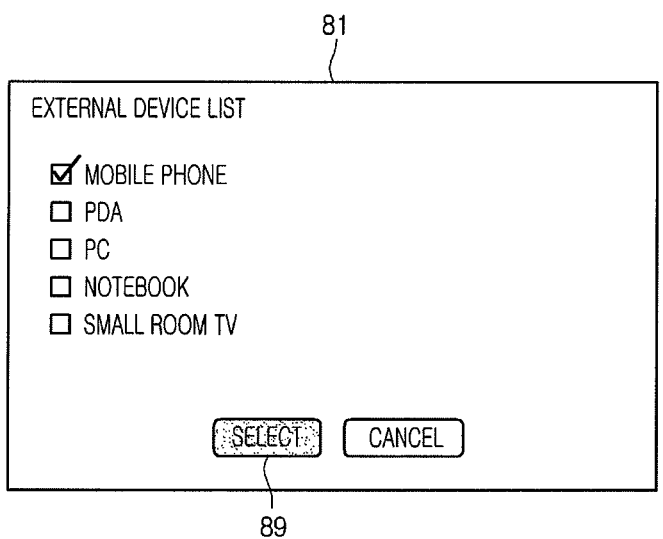
Figure 8:
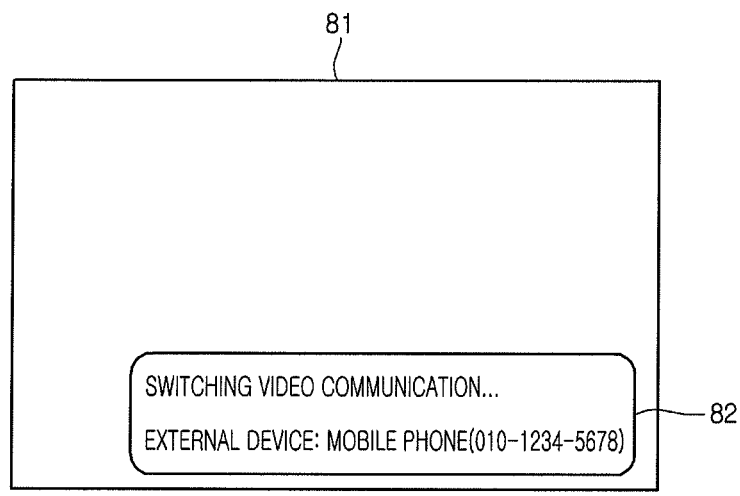

FIGS. 7A to 8 are diagrams illustrating embodiments of a method of switching video communication to an external device.

Referring to FIG. 7A, the user can transmit the video communication to the external device 90 while receiving the video communication. For example, it is possible to display a message saying that a video communication is received from "USER 1" who is the counterpart on the display screen 81 of the second video communication apparatus 80, and the user at the display screen 81 can select any one of "Answer", "Reject", and "Switch" for the received video communication.

When the second video communication apparatus 80 is playing specific contents as a display apparatus, as shown in FIG. 7A, the message saying that the video communication has been received can be display by a pop-up window 82. When the user selects the "Answer" button 83 while the video communication is received, as shown in FIG. 7B, the videos of the user and the counterpart are displayed on the screen 81 and the video communication can be performed at the second video communication apparatus 80.

On the other hand, when the user selects the "Reject" button 84, the second video communication apparatus 80 may not connect and respond to the received video communication. For instance, the actual video communication may not commence or may be terminated.

Alternatively, when the user selects the "Switch" button 85, the second video communication apparatus 80 can transfer the received video communication to the external device 90 that the user wants. For instance, the user can decide to route the video communication directed to the apparatus 80 to any other device that the user selects.

During the active video communication, referring to FIG. 7B, the user can select any one of "End", "Stop", and "Switch" for the active video communication. For example, when the user selects the "End" button 86 during the active video communication, the video communication that is being performed ends and the connection with the first video communication apparatus 70 may be terminated. When the user selects the "Stop" button 87, the video communication is stopped or paused for a predetermined time that the user wants, such that data transmission can be stopped between the first and second video communication apparatuses 70, 80 during that time period.

Alternatively, when the user selects the "Switch" button 88, the second video communication apparatus 80 can switch the received video communication to the external device 90 that the user wants.

For instance, referring to FIG. 7C, when the user requests switching of the video communication to the external device 90 while the video communication is taken or is being performed, for example, when the user selects the "Switch" button 85 or 88, a list of external devices including a plurality of external devices that are capable of performing the switched video communication can be displayed on the screen 81 of the second video communication apparatus 80.

For example, the list of external devices may include a "mobile phone", a "PDA", a "PC", a "notebook", and a "small room TV", and the external devices may be devices registered in the second video communication apparatus 80 in advance by the method described with reference o FIG. 6, or devices searched and detected to be connectable with the second video communication apparatus 80 when the switch is requested.

Meanwhile, the list of external devices may include identification information of the external devices, such as serial numbers, telephone numbers, and/or IP addresses.

The user can switch the video communication from one device to a corresponding external device, by selecting one device from the list of external devices which are displayed on the screen 81 of the second video communication apparatus 80.

As shown in FIG. 7C, when the user checks the box for the "mobile phone" and then presses the "Select" button 89, the second video communication apparatus 80 can switch the video communication that has been taken or is being performed to the selected "mobile phone". For example, when a video communication is received to the 'living room TV' (the second video communication apparatus 80), the user can request switching of the received video communication to his/her mobile phone (the external device 90) by using the mobile phone or the living room TV or other connected device.

In this case, information on his/her mobile phone, which is the external device 90 where the video communication is switched, can be displayed on the screen 81 of the 'living room TV' that has received the video communication.

Further, as described above, when the switching of the video communication to the external device 90, the controller 100 of the second video communication apparatus 80 can finish the operation of the user interface 140, e.g., the input of the user's video/voice using the camera 141 and the microphone 142, and the output of the counterpart's video/voice using the display unit 143 and the voice output unit 144.

Accordingly, the video/voice according to the video communication may not be input/output any more to/from the second video communication apparatus 80, but can be input/output by the external device 90, after the video communication switching.

Referring to FIG. 8, when it is requested to switch the video communication as described above, a message saying that the video communication has been switched from the second video communication apparatus 80 to the external device 90 (in this example, the mobile phone) and is now being performed by the "mobile phone" can be displayed as a pop-up window 82 on the screen 81 of the second video communication apparatus 80.

Meanwhile, preferably since only the input/output operation of the user interface 140 in the second video communication apparatus 80 described above is finished when there is a request for switching the video communication, the second video communication apparatus 80 can continue to receive the AV data from the first video communication apparatus 70 and transmit the received AV data to the external device 90.

Returning to FIG. 5, when the user input/output is finished, as described above, the second communication unit 120 of the second video communication apparatus 80 notifies the external device 90 that the switching of the video communication has been completed (step 350).

Meanwhile, the external device 90 that has been notified that the switching has been completed produces/outputs to the user the AV data received from the second video communication apparatus 80, and accordingly, the user at the external device 90 can watch and listen to the counterpart's video/voice through the external device 90.

Thereafter, the second communication unit 120 receives the AV data of the user from the external device 90 (step 360) and then transmits the received AV data of the user to the video communication apparatus of the counterpart, that is the first video communication apparatus 70 (step 370).

For example, the external device 90 having been notified that the switching has been completed can generate AV data corresponding to the user's video/voice by using the camera and the microphone associated with the external device 90 and then transmit the generated AV data to the second video communication apparatus 80, which in turn transfer the AV data of the user to the counterpart's apparatus 70 during the video communication.

Therefore, the counterpart of the first video communication apparatus 70 can watch and listen to the video and voice of the user which were acquired through the external device 90, such that the user and the counterpart carry out the video communication using the first video communication apparatus 70 and the external device 90.

Figure 9:
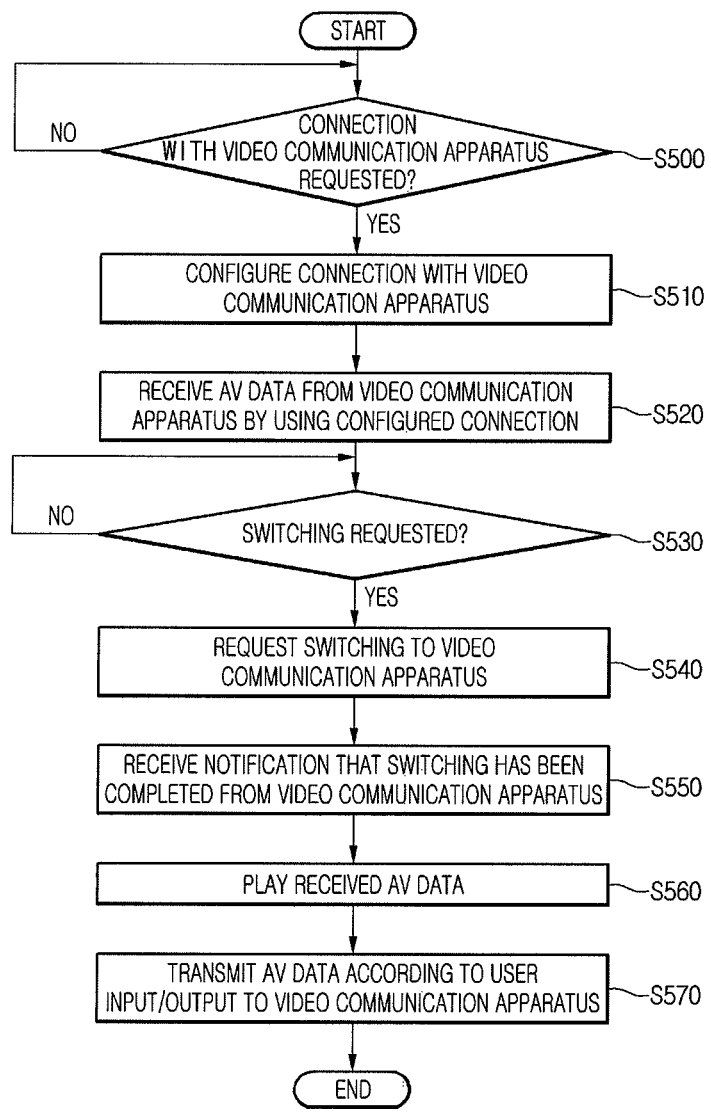
FIG. 9 is a flowchart illustrating a method for connecting video communication according to a third embodiment of the present invention.

FIG. 9 is a flowchart showing a method for connecting a video communication according to a third exemplary embodiment of the present invention, which is preferably performed in the external device 90. The steps in the method for connecting video communication shown in FIG. 9 that are the same as those described with reference to FIGS. 2 to 8 will not be repeated hereafter.

Referring to FIG. 9, the external device (e.g., device 90) receives a request for connection with the video communication apparatus (step 500) and configures itself for the connection with the video communication apparatus (step 510).

For example, when the video communication is received by the second video communication apparatus 80 (the video communication apparatus of the user), the external device 90 registered in the second video communication apparatus 80 can configure a wire/wireless network for data transmission/reception in accordance with a request from the second video communication apparatus 80.

Thereafter, the external device 90 receives the AV data from the video communication apparatus 80, using the configured connection (step 520).

As described above, before the user requests for switching the video communication, the external device 90 can receive the AV data received from the first video communication apparatus 70 in the video communication, through the second video communication apparatus 80, by configuring the connection between the second video communication apparatus 80 and the external device 90.

However, the external device 90 may not play or display the received AV data, before switching is requested. In other words, the external device 90 only receives the AV data from the second video communication apparatus 80, but may not output the AV data, before the user requests the switching of the video communication to the external device 90, such that the user may not watch and listen to the counterpart's video/voice with the external device 90 before the request.

Meanwhile, before switching of the video communication is requested, the external device 90 may not transmit the AV data to the second video communication apparatus 80 by using the configured connection.

In more detail, the external device 90 temporarily stores the AV data received from the second video communication apparatus 80 in a buffer and decodes the temporarily stored AV data, but does not play it, and can delete the temporarily stored AV data in a FIFO (First Input First Output) way in order to prevent the overflow of the buffer.

When the user requests switching of the video communication, e.g., using the input unit of the external device 90 (step 530), the external device 90 transmits the request for switching the video communication to the video communication apparatus (step 540).

For example, the external device 90 can request the switching of the video communication to the second video communication apparatus 80, play or display/output the AV data according to the video communication, and perform operations for the user input/output acquiring the user's video/voice.

Figure 10:
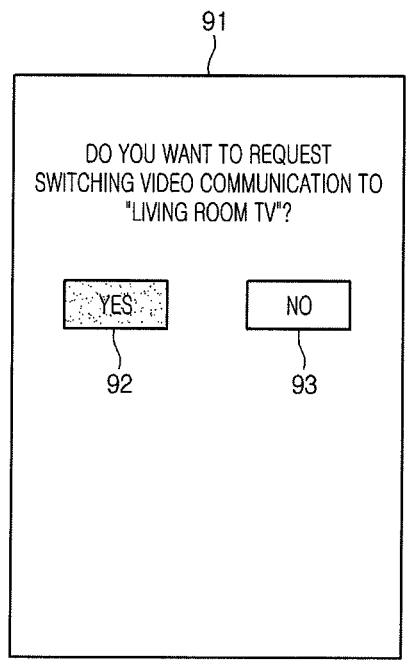
FIGS. 10 and 11 are diagrams illustrating an embodiment of a method of switching video communication from an external device.

Referring to FIG. 10, the user can request switching of video communication received from the second video communication apparatus 80, for example, the 'living room TV', using the external device 90, for example, the 'mobile phone', such that sentences and buttons 92, 93 for requesting the switching of the video communication can be displayed on the screen 91 of the external device 90.

Returning to FIG. 9, when being notified that the switching has been completed from the video communication apparatus 80 in response to the request for switching (step 550), the external device 90 plays the received AV data (step 560). For example, the external device 90 displays or outputs the AV data, which has been received, e.g., the counterpart's video and voice which are received through the second video communication apparatus 80 such that the user at the external device 90 can watch and listen to them, after being notified that the switching of the video communication has been completed from the second video communication apparatus 80.

In other words, after being notified that the switching has been completed, the external device 90 decodes the AV data from the counterpart, which are received from the second video communication apparatus 80 and temporarily stored in the buffer, and can play the decoded data by using the display module and the voice output module of the external device 90.

Figure 11:
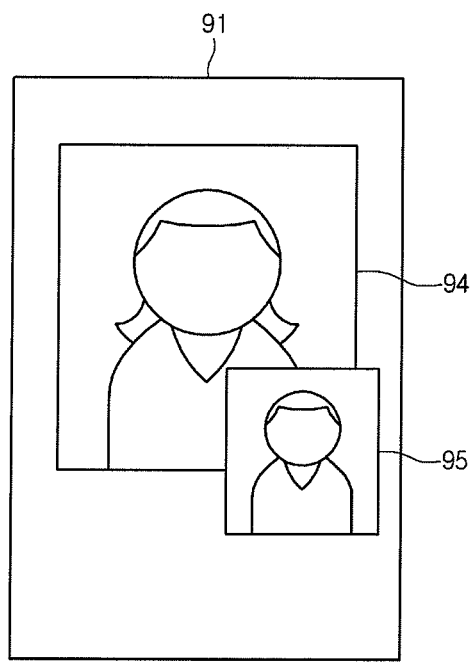

Referring to FIG. 11, the user can be provided with the counterpart's video 94 and his/her video 95 for video communication through the screen 91 of the external device 90, for example, the 'mobile phone'.

Meanwhile, the external device 90 transmits the AV data according to the user input to the video communication apparatus 80 (step 570). For example, after being notified that the switching has been completed, the external device 90 can generate AV data corresponding to the user's video/voice by using the camera and the microphone of the external device 90 and then transmit the generated AV data to the second video communication apparatus 80. Then the AV data (e.g., user's voice and video and other data such as message or pictures) transmitted from the external device 90 to the second video communication apparatus 80 can be transmitted and played in the first video communication apparatus 70 of the counterpart. As such, video communication between the user at the external device 90 and the counterpart at the first video communication apparatus 70 can take place through the second video communication apparatus 80.

Although it was described that the connection between the second video communication apparatus 80 and the external device 90 is configured before the user's request for video communication switching, with reference to FIGS. 5 to 11, the present invention is not limited thereto. For example, the second video communication apparatus 80 may transmit/receive the AV data by configuring the connection with the external device 90 after the user's request for video communication switching.

In more detail, the connection between the second video communication apparatus 80 and the external device 90 may be configured, after the user requests for the video communication switching, in consideration of the signal transmission/reception performance or interference at the frequency band for transmitting/receiving data between the second video communication apparatus 80 and the external device 90 or power consumed by the apparatus(es).

Figure 12:
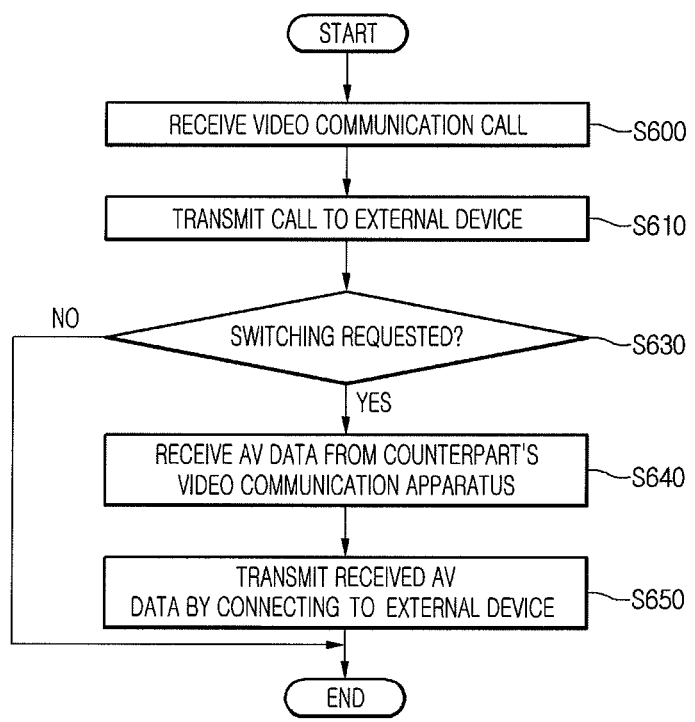
FIG. 12 is a flowchart showing an embodiment of a method of transmitting a video communication call to an external device.

FIG. 12 is a flowchart of an embodiment of a method of transmitting video communication calls to an external device, in which the method of transmitting calls will be described in connection with the block diagrams shown in FIGS. 2 and 3.

Referring to FIG. 12, the first communication unit 100 of the second video communication apparatus 80 receives a video communication call from the first video communication apparatus 70 of the counterpart (step 600) and transmits the received call to the external device 90 (step 610).

For example, the user can set in advance the transmission/routing of a video communication call to the external device 90, and accordingly, the video communication call received at the second video communication apparatus 80 can be transmitted/routed to the external device 90.

In more detail, the controller 110 can store information on the external device 90 where the call is transmitted in accordance with the setting-up of call transmissions into the storage unit 150, and can transmit the call to the external device 90 by using the information stored in the storage unit 150 when receiving a video communication call.

The external device 90 that has received the video communication call can inform the user that the video communication call has been received from the first video communication apparatus 70.

Thereafter, the controller 110 ascertains whether there has been a request for switching the video communication from the external device 90 (step 630).

Figure 13:
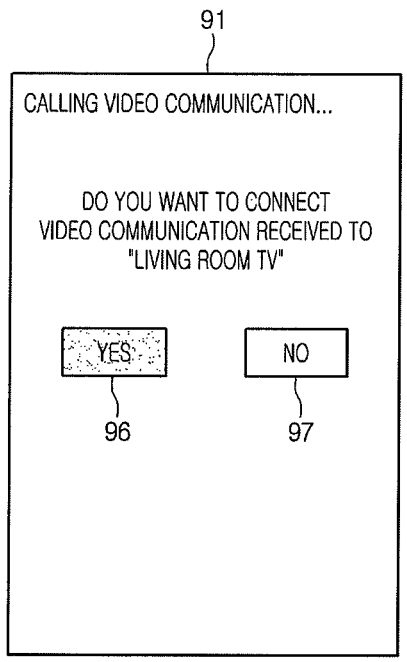
FIG. 13 is a diagram illustrating an embodiment of a method of connecting video communication from an external device receiving a video communication call.

Referring to FIG. 13, the 'mobile phone' (an example of the external device 90) that has received the video communication call can display that the video communication call has been received on the screen 91 of the mobile phone, and can receive a selection about whether to receive the video communication switched from a 'living room TV' (an example of the second video communication apparatus 80) by the user.

For example, when the user requests video communication switching by selecting the "YES" button 96 in the buttons 96, 97 on the screen 91 of the external device 90, the first communication unit 100 receives AV data from the first video communication apparatus 70 (step 640) and is connected to the external device 90 to transmit the received AV data to the external device 90 (step 650).

The process in the steps 640 and 650 after the request for video communication switching may be the same as that described with reference to FIGS. 5 to 11.

Figure 14:
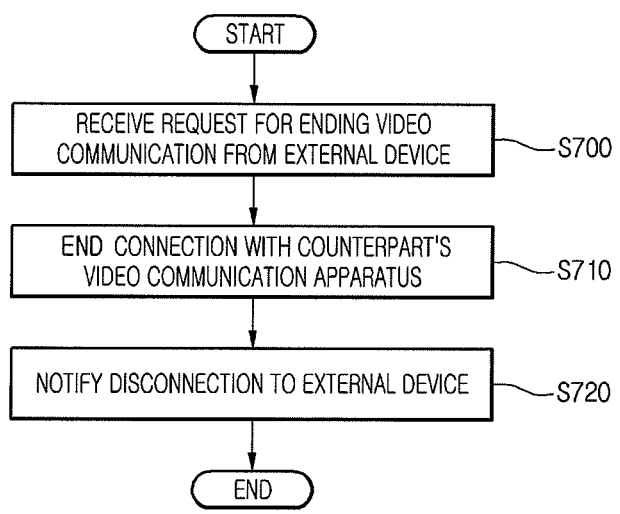
FIG. 14 is a flowchart illustrating an embodiment of a method of ending video communication.

FIG. 14 is a flowchart illustrating an embodiment of a method of ending video communication.

Referring to FIG. 14, the second communication unit 120 of the second video communication apparatus 80 is requested to end video communication, where this request is received from the external device 90 (step 700). Then in response, the second communication unit 120 ends the connection with the first video communication apparatus 70, which is the video communication apparatus of the counterpart (step 710). For example, the controller 110 of the second video communication apparatus 80 ends data transmission/reception with the first video communication apparatus 70 for video communication in accordance with the request for ending the video communication.

Thereafter, the second communication unit 120 of the second video communication apparatus 80 notifies that the disconnection (or ending of the video communication) has been completed, to the external device 90 (step 720).

Figure 15:
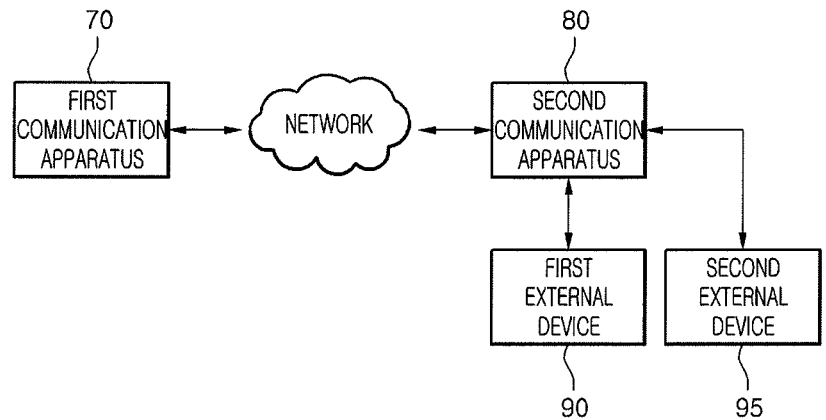
FIG. 15 is a block diagram illustrating the configuration of a video communication system according to another embodiment of the present invention.

FIG. 15 is a block diagram illustrating the configuration of a video communication system according to another embodiment of the present invention, in which the features in the configuration of the system in FIG. 15 that are the same as those provided with reference to FIGS. 1 to 14 are not repeated below.

Referring to FIG. 15, the second video communication apparatus 80 of the user can be connected with a plurality of external devices 90 and 95, and accordingly, video communication received to the second video communication apparatus 80 from the first communication apparatus 70 can be switched to at least one of the plurality of external devices 90 and 95.

A method of switching the video communication received by the second video communication apparatus 80 to the first external device 90 or the second external device 95 is the same as that described with reference to FIGS. 3 to 14 and the detailed description is not provided. Further, the video communication may be switched from the second communication apparatus 80 to the multiple external devices 90, 95 simultaneously.

According to an embodiment of the present invention, the video communication apparatus can be simultaneously connected with a plurality of external devices, and accordingly, the received video communication can be switched to one or more of the plurality of external devices.

For example, the second video communication apparatus 80, in more detail, the second communication unit 120 of the second video communication apparatus 80 is connected with the first external device 90 and the second external device 95 and can transmit or transfer the AV data received from the first video communication apparatus 70 to the first and second external devices 90 and 95 (or either device) and can also transmit the AV data received from the first and second external device 90 and 95 (or either device) to the first video communication apparatus 70 through the network.

In this case, the second video communication apparatus 80 can synchronize the AV data received from the first external device 90 with the AV data received from the second external device 95 and transmit it to the first video communication apparatus 70. For example, the controller 110 of the second video communication apparatus 80 can synchronizes the AV data by performing a drop of delay data or combining the same time data by using a time stamp, etc. of the AV data received from the first and second external devices 90 and 95.

Therefore, it is possible to easily switch the video communication received by the second video communication apparatus 80 from the first communication apparatus 70 to the plurality of external devices 90 and 95, such that two or more users can make and participate in video communication.

Figure 16:
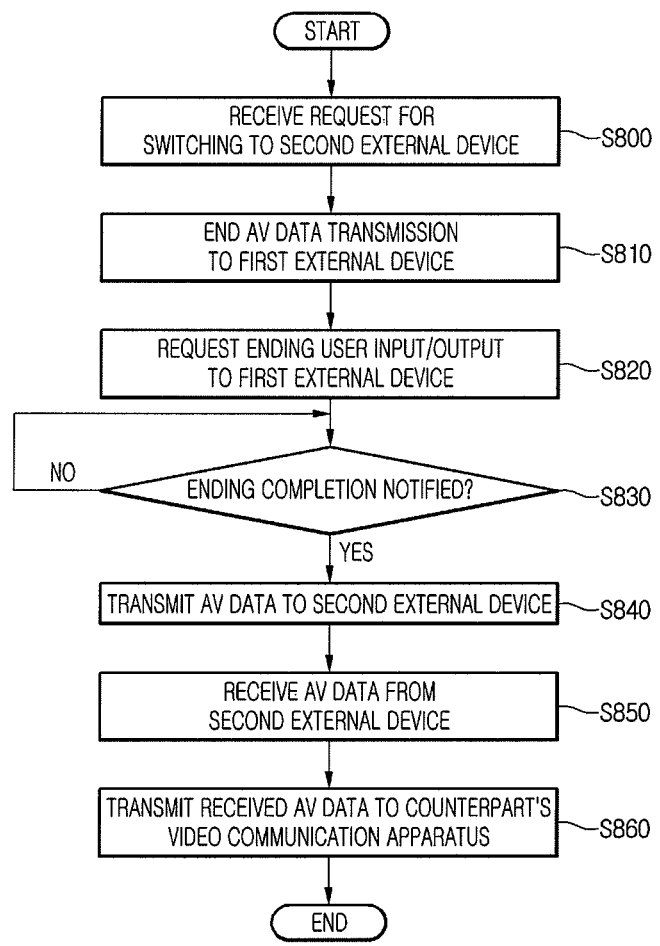
FIG. 16 is a flowchart illustrating a method for connecting video communication according to a fourth embodiment of the present invention.

FIG. 16 is a flowchart showing a method for connecting a video communication according to a fourth exemplary embodiment of the present invention, wherein the method for connecting video communication is described in connection with the block diagram shown in FIG. 15. Meanwhile, the same features in the method for connecting video communication shown in FIG. 16 as those described with reference to FIGS. 3 to 15 may not be repeated hereafter.

Referring to FIG. 16, a second video communication apparatus 80 is requested to switch video communication to a second external device 95 (step 800).

For example, the second video communication apparatus 80 may be switching a video communication received from the first communication apparatus 70 (or other apparatus) to a first external device 90 in accordance with a user's request, and then the user who is having the video communication with the first external device 90 can request a switching from the first external device 90 to the second external device 95, which is another external device.

According to the switch request, the second communication apparatus 80 ends the AV data transmission to the first external device 90 (step 810) and requests the end of input/output of the user to the first external device 90 (step 820).

Accordingly, the first external device 90 acquires the user input/output, for example, video and voice of the user, using the camera or the microphone and stops generating the AV data, and can inform that the user input/output from the first external device 90 to the video communication apparatus 80 ends, after the AV data transmission (e.g., acquired video and voice of the user) to the second video communication apparatus 80 ends.

When receiving the last AV data transmission from the first external device 90, the second video communication apparatus 80 transmits the AV data to the second external device 95 (step 840) and switches the video communication from the first external device 90 to the second external device 95.

Further, the second video communication apparatus 80 receives the AV data from the second external device 95 (step 850) and transmits the received AV data to the first video communication apparatus 70 (step 860). As such, the video communication between the first communication apparatus 70 and the second external device 95 is established through the second communication apparatus 80.

The connection for the transmission/reception of the AV data between the second video communication apparatus 80 and the second external device 95 can be configured before switching from the first external device 90 to the second external device 95 is requested, as described above with reference to FIG. 76, or may be configured after the switch request in step 800 or after the user input/output end finish notification in step 830.

Figure 17:
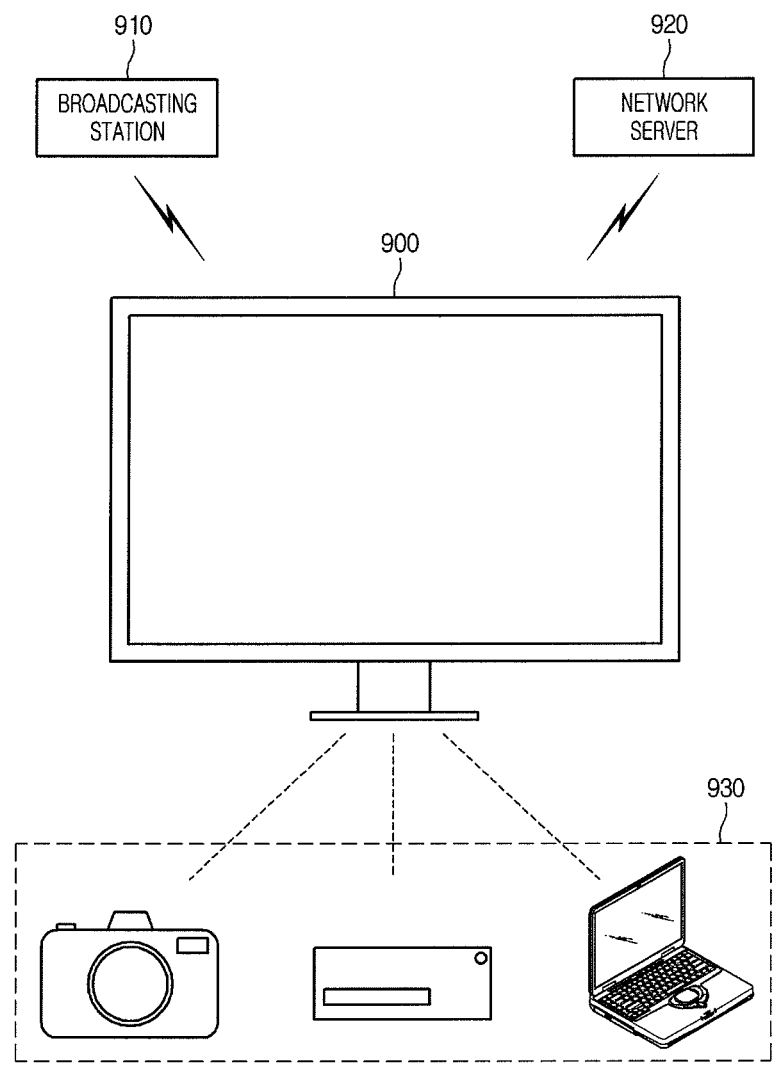
FIG. 17 is a diagram illustrating the configuration of a display system according to an embodiment of the present invention.

FIG. 17 is a diagram illustrating the configuration of a display system according to an embodiment of the present invention.

Referring to FIG. 17, a display apparatus 900 is connected with a broadcasting station 910, a network server 920, and/or an external device 930 by a network and can transmit/receive data therebetween. All components of the display system are operatively coupled and configured.

The display apparatus 900 can receive a broadcasting signal including video signals transmitted from the broadcasting station 910. The display apparatus 900 may process a video signal and a voice signal included in the broadcasting signal, or a data signal in a format suitable for output. The display apparatus 900 can output video or voice based on the processed video signal. The display apparatus 900 can be a TV, a computer, etc.

Meanwhile, the display apparatus 900 can communicate with the network server 920. The network server 920 is an apparatus that can transmit/receive signals to/from the display apparatus 900 through a wire/wireless network. For example, the network server 920 may be a portable terminal that can be connected with the display apparatus 900 through a wire or wireless station.

Further, the network server 920 may be an apparatus that can provide the display apparatus 900 with contents through the internet network. A contents provider can provide the display apparatus 900 with contents, using a network server.

Meanwhile, the display apparatus 900 can transmit/receive data to/from the external device 930. The external device 930 is a device that can directly transmit/receive a signal to/from the display apparatus 900 in wire or wireless communication. For example, the external device 930 may be a media storage device or a play device which a user uses. The external device 930 may be a mobile phone, a PC, a laptop, a camera, a DVD, a multimedia player, an audio player, or a blue-ray player, etc.

Figure 18:
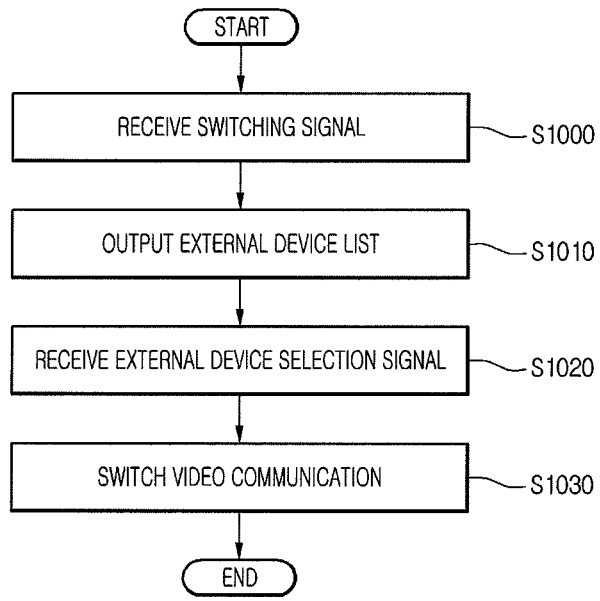
FIG. 18 is a flowchart illustrating a method for connecting video communication according to a fifth embodiment of the present invention.

FIG. 18 is a flowchart illustrating a method of connecting a video communication according to a second embodiment of the present invention and the same portions as those described in connection with FIGS. 1-16 may not be repeated below. The method of FIG. 18 can be implemented in the system of FIG. 17 or other suitable system.

Referring to FIG. 18, the display apparatus 900 receives a switch signal for a received video communication (step 1000). For example, the switch signal may be a hotkey input signal of the display apparatus 900 or a remote controller that controls the operation of the display apparatus 900. Further, it may be a selection signal for a predetermined menu item included in the user interface image of the display apparatus 900 that is in video communication. For instance, the user may select a key to generate this switch signal.

The display apparatus 900 outputs a list of external devices that can receive the requested switched video communication (step 1010). For example, the list of external devices may be shown by a semi-transparent color or displayed on a predetermined region, where the video communication is not displayed, on the screen of the display apparatus 900, in order not to interfere with the video communication that is being performed now at the display apparatus 900.

Further, the external devices that are normally connected to the network server providing the current video communication and the other external devices that are not normally connected can be displayed in different ways.

The display apparatus 900 can acquire position information of the external devices by using GPS means and construct a list of external devices by using the position information.

Thereafter, the display apparatus 900 receives selection signal(s) for one or more external devices identified in the list of external devices (step 1020). The user can select one or more external devices for switching the video communication received by the display apparatus 900, from the list of external devices through the user input interface, e.g., using the remote controller, the menu screen on the display apparatus 900, etc.

In response, the display apparatus 900 switches the video communication to the external device that the user has selected, in link with the network server 920 providing the video communication (step 1030). For example, the display apparatus 900 can transmit the connection information of the video communication and information on the selected external device to the network server 920 providing the video communication in order to switch the video communication to the selected external device. As such, the video communication directed to the display apparatus 900 and received from the network server 920 or other device can now be switched and be directed to the selected external device 930 through the display apparatus 900.

Figure 19:
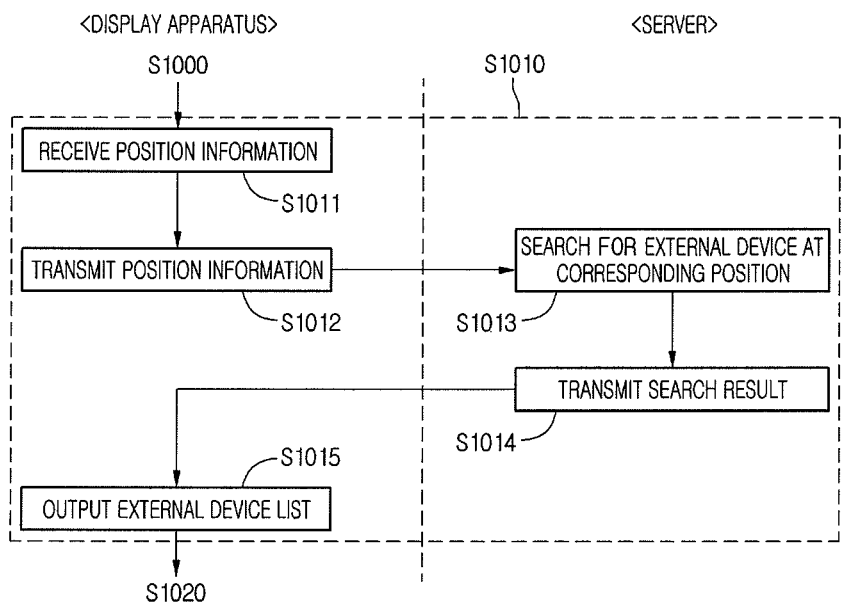
FIG. 19 is a flowchart showing an embodiment of outputting a list of external devices of FIG. 18.

FIG. 19 is a flowchart showing an example of the step of outputting a list of external devices (step 10101) in the method of FIG. 18.

Referring to FIG. 19, when a switch signal for the video communication is received in step 1000 of FIG. 18, the display apparatus 900 that is in the video communication receives position information by using a GPS means (step 1011). For instance, the display apparatus 900 determines the current position of the display apparatus 900 itself. For this operation, the display apparatus 900 may be equipped with a GPS. The GPS (Global Positioning System) is a system that makes it possible to find the current accurate position by using satellites and the display apparatus 900 can receive information on which position is the current position of the display apparatus 900.

Next, the display apparatus 900 transmits the received position information to a sever through a network connection (step 1012). The network connection may be various wire/wireless networks that can transmit/receive data, including the internet network, and the display apparatus 900 transmits the position information to a predetermined server through the network connection.

Further, the display apparatus 900 can request for an agreement/approval for the transmission of the position information to the user before transmitting the position information.

The sever searches whether there is an external device, which can take on the requested switched video communication, within a predetermined region including the current location of the display apparatus 900 (step 1013).

For example, the position information of the external devices that can make video communication is stored in the server, such that the server can output a list of external devices around the display apparatus 900 by using the stored information, when search is requested.

Further, depending on embodiments, when the position information of the external devices that can take on the video communication is not stored in the server, it is possible to construct a list of external devices at a predetermined region around the display apparatus 900 by searching for external devices connected with the server by the network and acquiring the position information. Here, the range of the predetermined region or distance used to search for the switchable external devices may be set differently or varied by the user.

Thereafter, the server transmits the searched information regarding the external devices to the display apparatus 900 through the network (step 1014). For example, when the list of external devices located around the display apparatus 900 is determined by the result of the searching step, the sever can transmit the list of external devices to the display apparatus 900.

The display apparatus 900 outputs the list of external devices that can take on the requested switched video communication, by using the external device search information received from the server (step 1015). The list of external device can be displayed on the screen of the display apparatus 900.

Depending on embodiments, the list of external devices may show the distances between specific external devices and the display apparatus 900 and the external devices can be arranged and displayed in the order of such distance.

Figure 20:
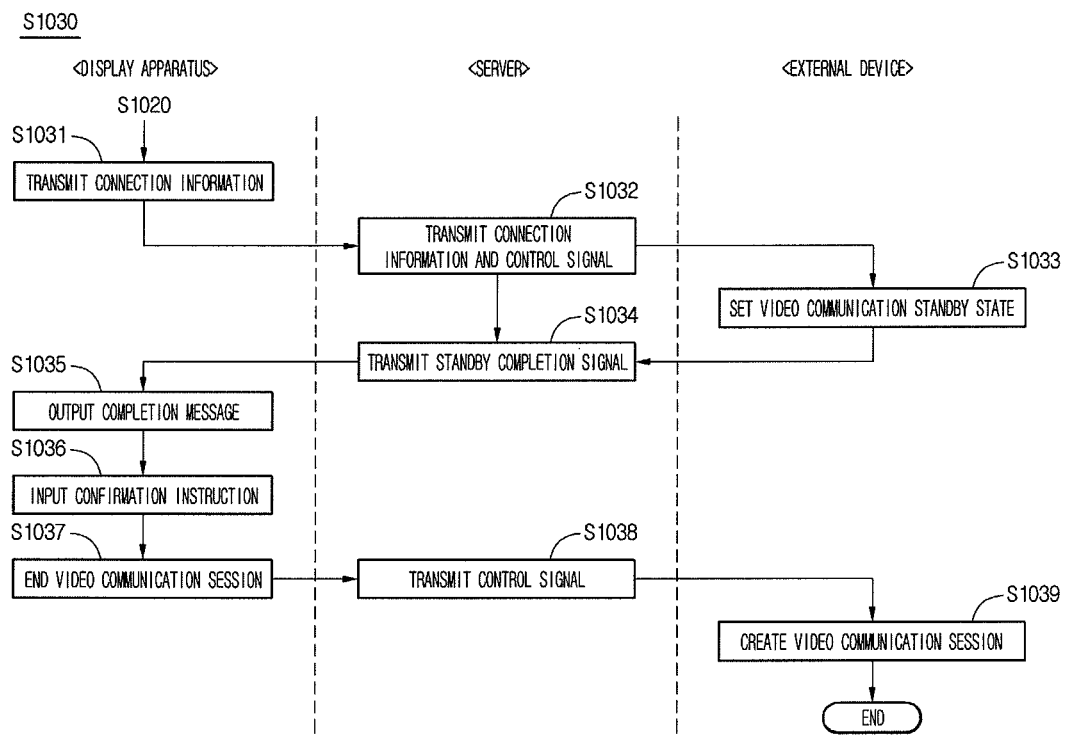
FIG. 20 is a flowchart showing an embodiment of switching video communication of FIG. 18.

FIG. 20 is a flowchart showing an example of the step S1030 of switching video communication in the method of FIG. 18.

Referring to FIG. 20, when an external device is identified to which the video communication is to be switched, the display apparatus 900 transmits connection information of the received video communication to the server (step 1031). The server transmits the connection information of the video communication and a control signal to the selected external device (step 1032).

For example, when the connection information of the video communication received by the display apparatus 900 and the information on the selected external device to which the video communication is to be switched are transmitted, the server can create and transmit a signal for controlling the selected external device by using the transmitted information.

The control signal may be a signal for setting up a standby state for creating a video communication session for the selected external device.

Thereafter, the external device is set into a video communication standby state by using the transmitted control signal and video communication connection information (step 1033). For example, the external device can be ready for receiving a confirmation instruction fro the server after completing the operation for creating the video communication session, and can minimize a disconnection of the video communication when the video communication is switched from the display apparatus 900 to the external device by the operation described above.

Further, the external device can transmit a signal informing that the standby state setting has been finished, to the server. On the contrary, when the standby state of the external device is not normally set, the external device can transmit a signal informing that the standby state cannot be set, to the server.

Thereafter, the server transmits a signal informing that the external device has been set to the standby state for switching the video communication to the display apparatus 900 (step 1034) and the display apparatus 900 outputs a message indicating that the setting for switching the video communication has been completed in response to the signal (step 1035).

The display apparatus 900 receives a confirmation instruction for switching the video communication from the user (step 1036) and ends the video communication session that is being performed at the display apparatus 900 (step 1037).

For example, even while the display apparatus 900 receives a request for switching the video communication and the operation for switching the video communication is performed in the server and the external device, the display apparatus 900 may continue with the video communication and ends the video communication session when the confirmation instruction is inputted. Therefore, it is possible to minimize disconnection or interruption when switching the video communication.

Thereafter, the display apparatus 900 transmits a signal informing that the video communication session at the display apparatus 900 has been completed to the server (e.g., server 920) and the server receiving the signal transmits a control signal to the selected external device (e.g., 930) (step 1038).

The server can transmit a control signal for creating a video communication session in the external device standing by video communication, to the external device, when receiving the signal informing that the video communication session at the display apparatus 900 is ended.

Then the external device creates a video communication session for performing the video communication with the counterpart's video communication apparatus, using the video communication connection information received in the step 1032 (step 1039). Accordingly, the external device carries out the video communication with the counterpart's video communication apparatus.

Since the external device has been set to the standby state for creating a video communication session in step 1033, the external device can switch to the video communication without disconnection or interruption by rapidly creating the video communication session, when the control signal is transmitted from the server.

FIGS. 21 to 28 are diagrams showing examples of a user interface image provided for switching a video communication according to an embodiment of the invention.

Figure 21:
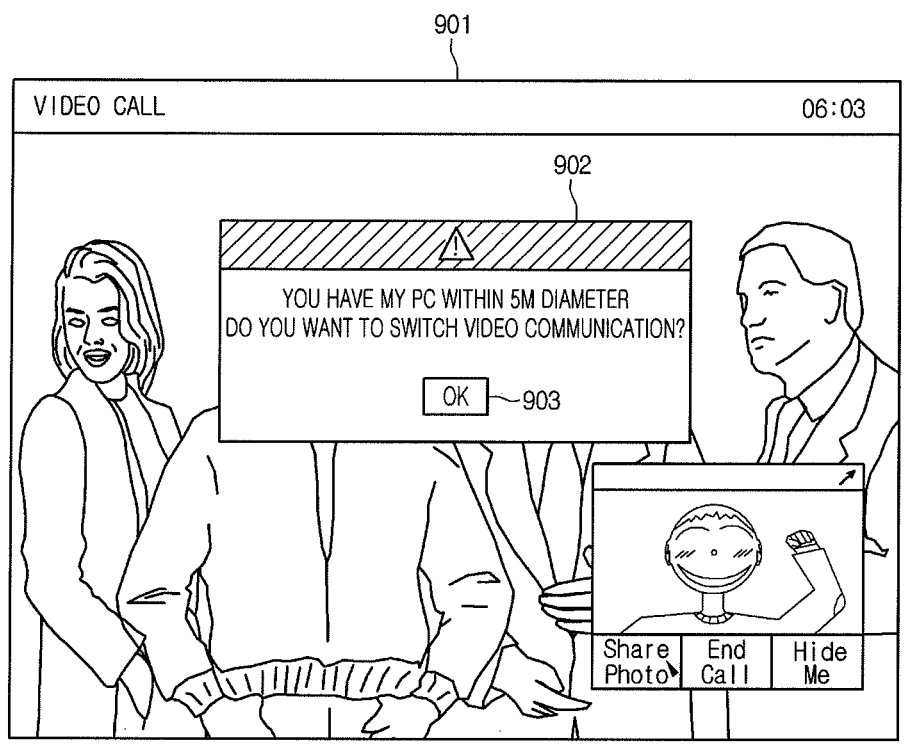
FIGS. 21 to 28 are diagrams showing examples of a user interface image provided for switching video communication.

Referring to FIG. 21, the display apparatus that is in video communication determines the current position information of the display apparatus 900 through the GPS in the display apparatus 900, and can transmit the determined position information to the server providing the video communication.

The sever searches whether there is an external device, which can take the requested switched video communication, within a predetermined region including the current position of the display apparatus 900, using the transmitted position information. When there are one or more external devices within the predetermined region, as the result of the search, an informing message 902 is outputted on the video communication user interface screen 901 of the display apparatus 900.

For example, the informing message 902 may include the inherent information of the external device and information on the distance from the display apparatus 900. Further, the informing message 902 may be shown by a semi-transparent color or on a predetermined region of the screen where the video communication data is not displayed, in order to minimize any interference with the video communication being performed now at the display apparatus 900.

Further, the user can perform a predetermined operation for switching the video communication by inputting a confirmation instruction in response to the informing message 902. For example, when the user selects the confirmation menu item 903 of the informing message 902, the display apparatus 900 can output a menu image including the list of external devices that are available for the requested switched video communication on the display unit or screen of the display apparatus 900.

Figure 22:
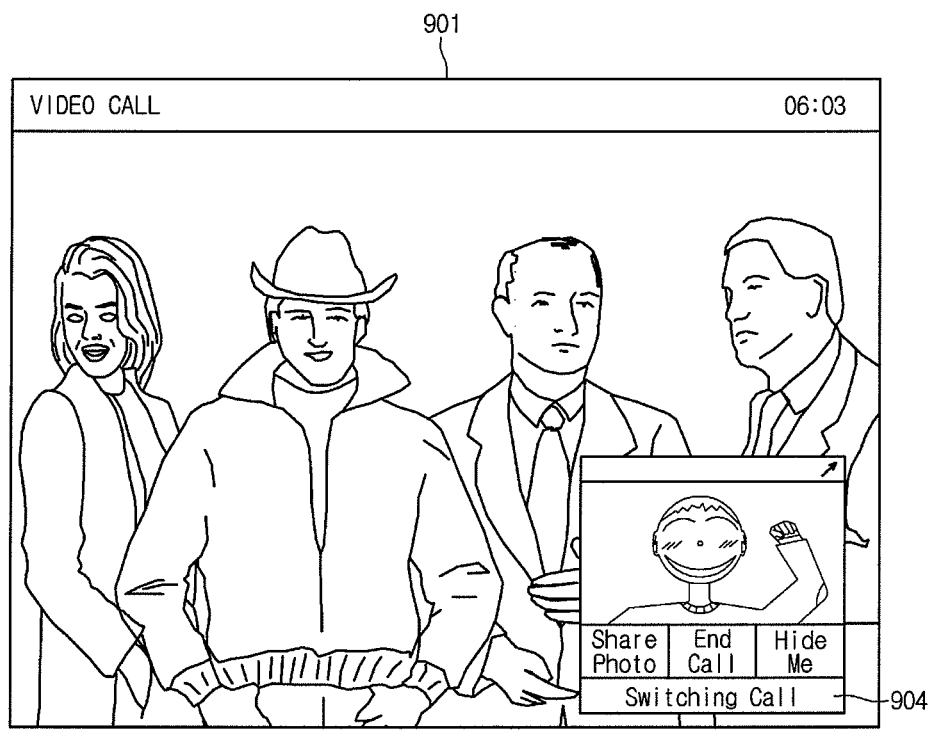

Referring to FIG. 22, the user interface image 901 of the display apparatus performing the video communication displays the counterpart at the center of the display screen and can display the video of the user who is in the video communication with a video communication terminal at a side or other part on the screen. For instance, the other party's image can be displayed in a main region of the screen of the display apparatus 900 while the image of the current user of the display apparatus 900 may be displayed on another region on the screen of the display apparatus 900.

Although menu items for common functions, such as share picture, end communication, and remove user image, are shown in FIG. 22, the user interface may include predetermined menu items for various functions in the video communication, depending on embodiments.

Further, the user interface may include a video communication terminal switch menu item 904, depending on embodiments. The video communication switch menu item 904, as shown in FIG. 22, may be displayed with a predetermined menu item, or individually displayed.

Further, the video communication switch menu item 904 may not be displayed, when there is no video communication terminal connected with a predetermined server providing the video communication at present, or when there is no external device that can take on the requested switched video communication within a predetermined region/distance including the position of the video communication terminal performing the video communication.

Figure 23:
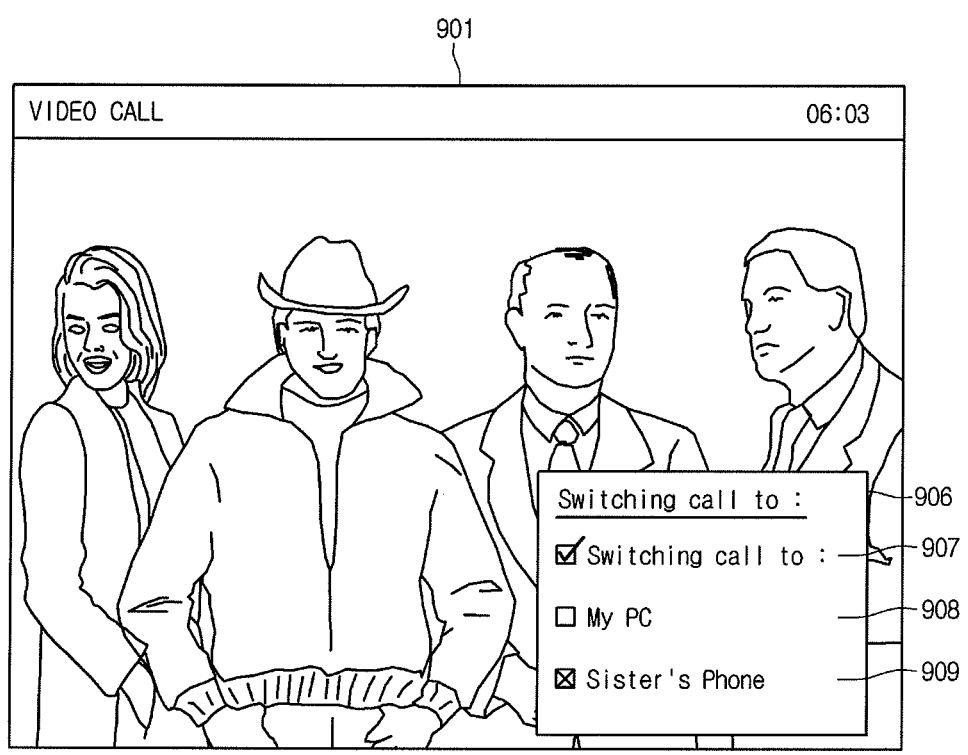

FIG. 23 shows an example of the user interface image 901 of the display apparatus 900, which includes a list 906 of external devices that can take on the requested switched video communication.

Referring to FIG. 23, the list 906 of external devices can be displayed, when the display apparatus 900 receives a request for switching the video communication received from the user or when an external device that can take on the requested switched video communication is searched and found within a predetermined region around the display apparatus 900 on the basis of the position information of the display apparatus 900.

For example, the list 906 of external devices may be shown by a semi-transparent color or displayed on a predetermined region, where the user interface is not displayed, on the display unit of the display apparatus 900, in order not to interfere with the video communication that is being performed in the display apparatus 900.

Further, the list of external devices 906 can show in different ways the external devices 909 that are not connected and the external devices 908 that are connected with the network by checking the network connection state between the server and the external devices in the list of external devices.

For example, the external devices 909 that are not currently connected with the server may be shown by semi-transparent colors while the external device 908 that are currently connected (e.g., currently in communication with) may be shown by thick fonts or outlines. And the user can select one of the external devices 909 that are currently connected from the list for the video communication switching.

Figure 24:
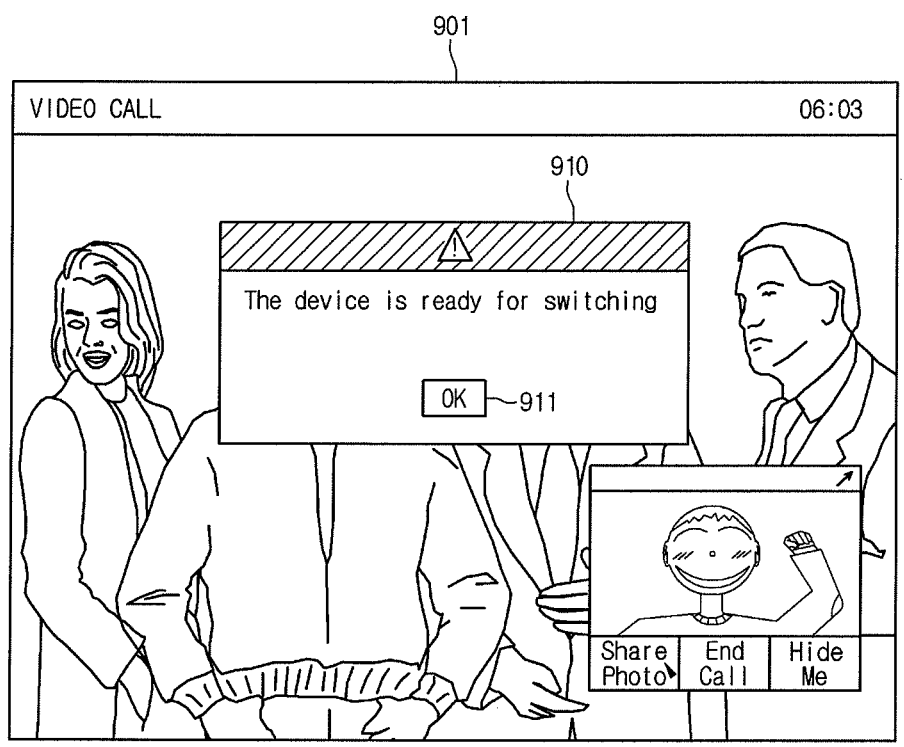

Referring to FIG. 24, when the device is ready for switching video communication requested by the user, the display apparatus 900 can output an informing message 910 on the user interface image 901.

For example, when the video communication standby state described above has been properly set by using the video communication connection information in the external device and a signal informing that the standby state has been set is transmitted to the display apparatus 900 through the server, the display apparatus 900 can display a switch ready message 910 shown in FIG. 24.

The user can input a confirmation instruction for the video communication switch, by selecting the OK button 911 after confirming the informing message 910.

When the confirmation instruction is inputted, the display apparatus 900 ends the video communication session that is currently being performed, and the external device creates a video communication session for the video communication switch by using the video communication connection information received from the server. And thus the external device takes on the switched video communication through the server.

Figure 25:
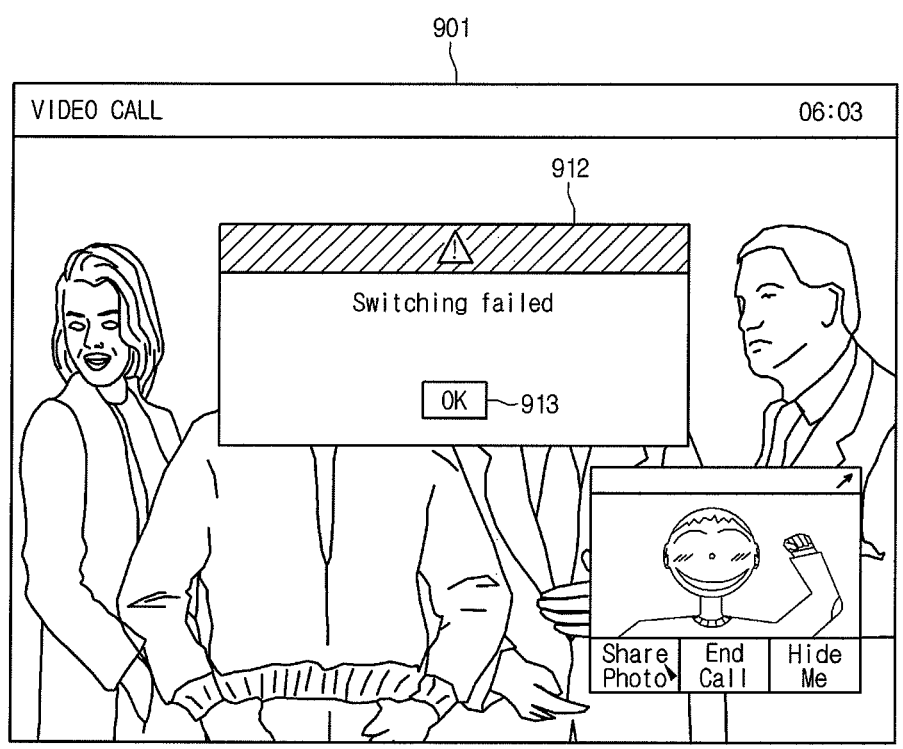

Referring to FIG. 25, in a case where the operation for video communication switching is not smoothly performed, the display apparatus 900 can display an error message 912 on the user interface image 901 of the display apparatus 90.

For example, when the network connection state between the external device and the video communication providing server is not normal or has other problem, or when the video communication session is not properly created in the external device, the error message 910 can be displayed by the display apparatus 900.

At that time, the user can continue the video communication with the display apparatus 900 while removing the error message 912, by selecting the OK button 913 after confirming the error message 912. As such, the video switching would not occur, and the user will continue the video call directly at the display apparatus 900.

Figure 26:
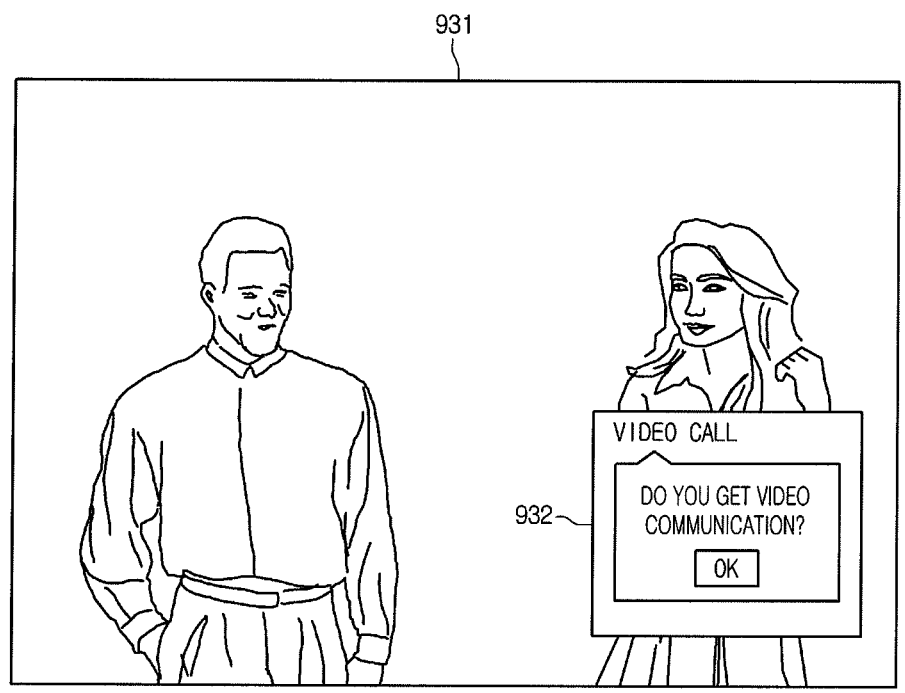

Referring to FIG. 26, when the external device receives a signal for video communication switch from the server providing the video communication while playing contents at the external device, the external device can display a switch informing message 932 informing that the external device has been requested to taken on the requested switched video communication, on the user interface 931 of the external device.

For example, the switch informing message 932 may be shown by a semi-transparent color or in a region where the contents are not displayed on the screen of the external device, in order not to interfere with playing the contents. Further, the informing message 932 can be outputted from the external device together with a predetermined sound.

The user can perform an operation for switching the video communication to the external device from the display apparatus 900, by inputting a confirmation instruction for the switch informing message 932.

For example, when the confirmation instruction is inputted, the external device can be set to the video communication switch standby state by receiving the connection information for the video communication performed by the display apparatus 900, from the server providing the video communication.

Figure 27:
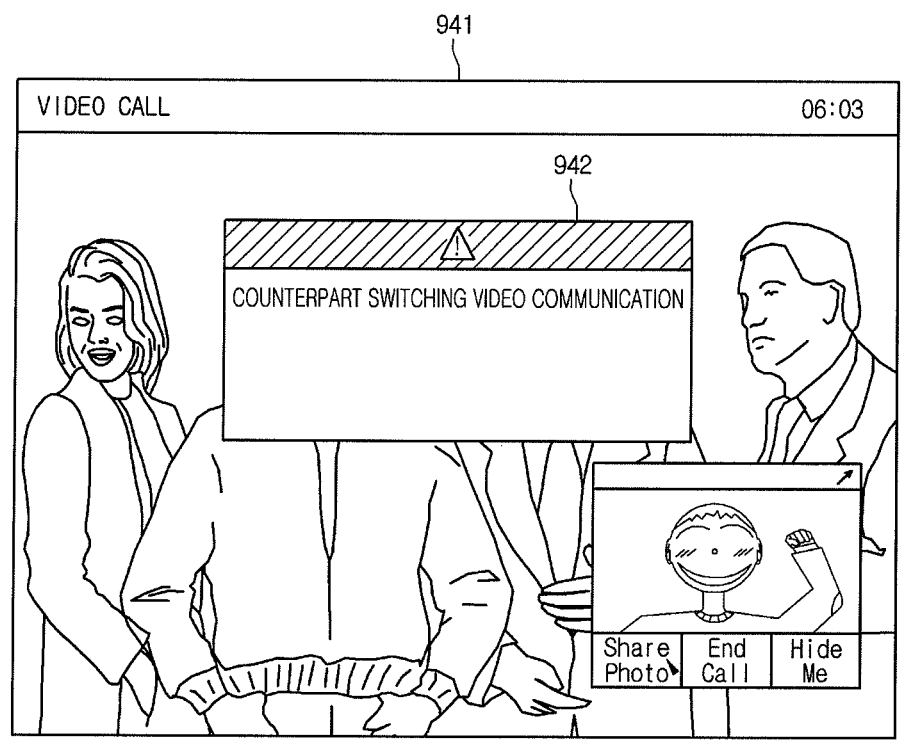

Referring to FIG. 27, in accordance with the request for switching the video communication, the video communication session is ended at the display apparatus 900 while the external device that will take on the requested switched video communication creates a video communication session by using the connection information of the video communication. And a standby message 942 can be displayed in the user interface image 941 of the counterpart's video communication apparatus.

For example, the counterpart's video communication apparatus can display, on the screen of the counterpart's video communication apparatus, the standby message 942 together with the inherent information about the display apparatus 900 and the external device that will take on the video communication, standby time information for video communication switch, and a predetermined animation image.

Figure 28:
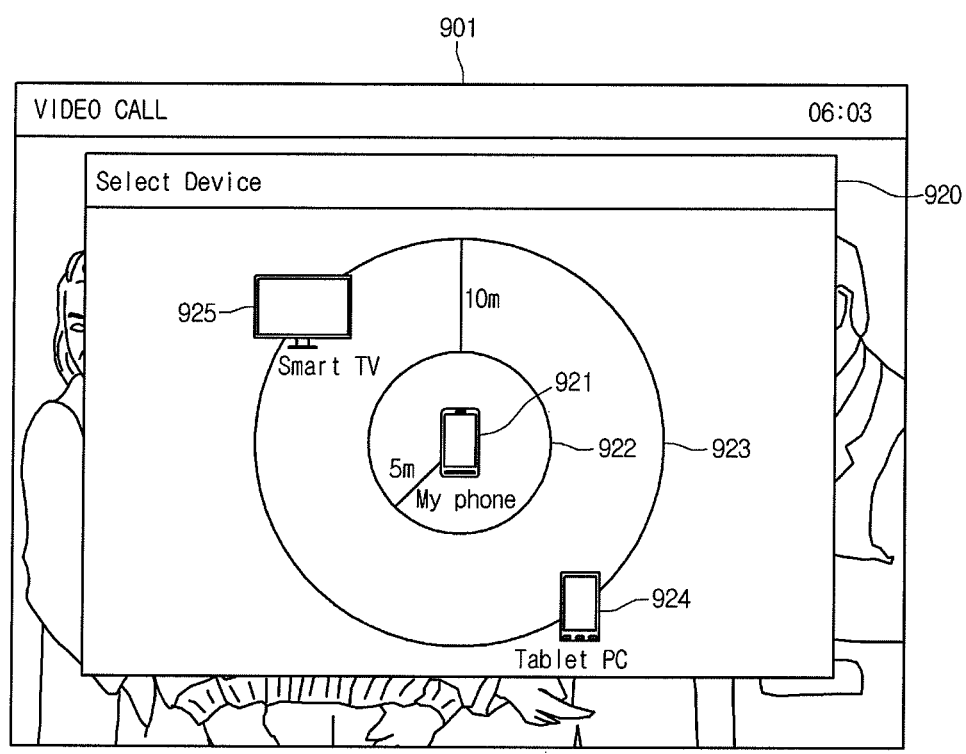

Referring to FIG. 28, when it is requested to switch the video communication, the display apparatus 900 can output, on the screen of the display apparatus 900, the user interface image 901 including the list 920 of external device that can take on the requested switched video communication.

For example, the list of external devices displayed by the display apparatus 900 may include images corresponding to the external devices and information on the distances between the display apparatus 900 and the corresponding external devices.

As shown in the example of FIG. 28, the list 920 of external devices that can take on the requested switched video communication can arrange images 921, 924, 925 of the external devices with respect to the display apparatus 900, in accordance with the distance from the display apparatus 900.

Further, the displayed list 920 of external devices may include predetermined reference lines 922, 923 that make it possible to determine the distance between the display apparatus 900 and the external devices.

The user can intuitively know the types and positions of the external device that can take on the requested switched video communication and easily select external device(s) that would be the most suitable to take on the requested switched video communication at the present position of the user, through the list of external devices.

A display apparatus according to an embodiment of the present invention can provide video communication services using a wire/wireless network, by using the video communication apparatus described above, and can also perform the methods of connecting and controlling video communications described above.

Hereinafter, a display apparatus according to an embodiment of the present invention is described by exemplifying a network TV. The methods of the present invention may be implemented using the network TV.

Figure 29:
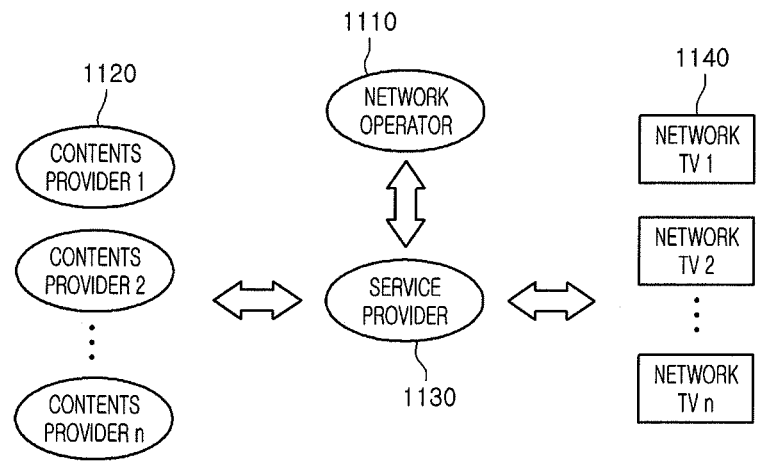
FIG. 29 is a block diagram showing an embodiment of the configuration of a display system.

FIG. 29 is a block diagram showing an embodiment of the configuration of a display system in which the display system may be composed of a network operator 1110, a contents provider 1120, a service provider 1130, and a network TV 1140. All components of the system are operatively coupled and configured.

The network operator 1110 can provide the network TV 1140 with basic software used for contents provided from the contents providers 1120 to operate in the network TV 1140. Further, it is possible to provide the contents provider 1120 with hardware information of the network TV 1140 which may be needed for the contents to operate in the network TV 1140.

For example, the network operator 1110 provides a main image implemented when the contents provided from the contents providers are displayed on the network TV 1140, and may provide a user interface for the users to select the contents or input various instructions and display corresponding outputs. Further, the user interface can also provide information for updating the firmware or the software of the network TV 1140, every time it is needed.

The contents provider 1120 produces a variety of contents that can be provided on the network and makes them in a format that the network TV 1140 can play, and can provide the contents in accordance with a request of the network TV 1140. The contents may be predetermined data that can be serviced by the network.

The network TV 1140 may be provided with an exclusive firmware for playing and searching the contents from the contents provider 1120, and displaying lists.

The firmware may be installed in the network TV in manufacturing the network TV 1140 or may be downloaded and installed from the network that the user uses.

Meanwhile, the firmware of the network TV 1140 may be a program for playing or executing the contents provided from the contents providers 1120. The firmware depends on the types of contents provided from the contents providers 1120. For example, when the contents provider 1120 is a VOD (Video On Demand) operator, the firmware may be a VOD play program, or when the contents provider 1120 is an AOD, MOD operator, the firmware may be an AOD, MOD play program.

Further, when the contents provider 1120 is a video communication operator, the firmware may be a video communication program.

The service provider 1130 may be an internet service provider who provides network communication among the network operator 1110, the contents provider 1120, and the network TV 1140.

The network may include a predetermined wire/wireless internet network using an internet protocol. In particular, the service provider 1130 can transmit the contents provided from the contents provider 1120 to the network TV 1140, maintains the transmission network such that the contents can be stably transmitted to the user, and provide an the contents provider with an infrastructure for transmitting the contents.

The network TV 1140 receives and plays or executes contents from the service provider 1130 in response to an instruction of a user. Depending on embodiments, the network TV 1140 may include a broadcasting receiver, such as a network set-top box, and predetermined devices equipped with a network module, such as a telephone for network.

For example, the contents provider 1120 may be an operator that produces various contents to provide to the network TV 1140. The contents provider 1120 may include a TV station, a radio station, a VOD operator, an AOD operator, a game operator, a video communication service provider, a weather information provider, a photo-related service provider, etc.

In more detail, the video communication service provider may provide a relay service to allow for a video call with a user who uses another network TV, through the network.

The service provider 1130 is a medium transmitting instructions and data of the network operator 1110, the contents provider 1120, and the network TV 1140. The service provider 1130 may be a common wire/wireless internet service provider. Further, the service provider 1130 can provide a communication network and hardware and various communication service, such as assigning IP addresses and adjusting bandwidth, in order that the network operator 1110, the contents provider 1120, and the network TV 1140 can smoothly perform communication therebetween.

The network TV 1140 basically has a network interface to be able to be connected to a network and is provided with an IP address to process a data packet through the network, and may store or play the data packet when the data packet is multimedia data, such as a video or audio.

Further, the network TV 1140 may perform bidirectional transmission of a user's requests while processing the multimedia data, and for this operation, a remote controller for controlling the network TV 1140 may be provided with buttons for controlling the network TV, that is, buttons for selecting a variety of menus.

Figure 30:
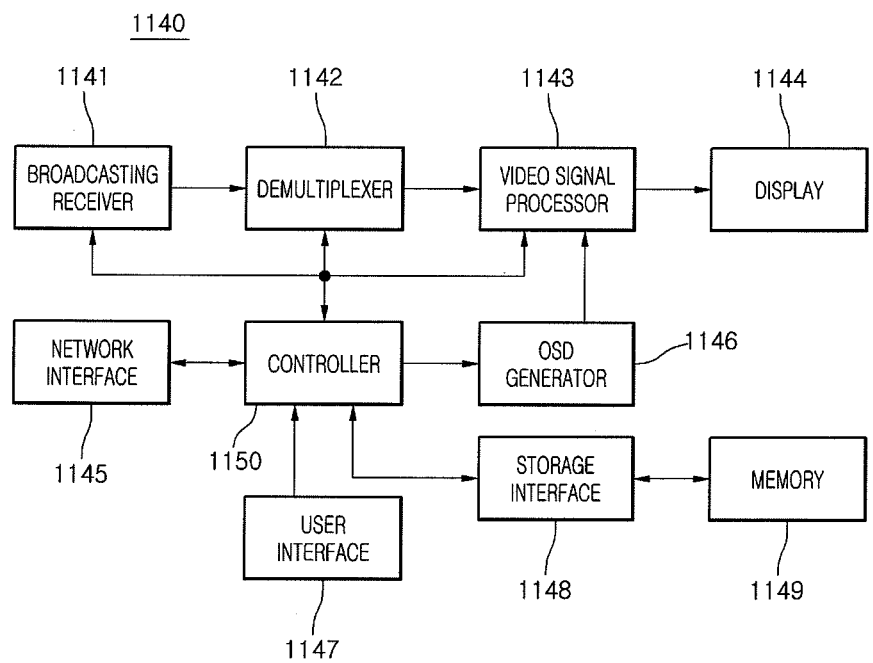
FIG. 30 is a block diagram illustrating the configuration of a display apparatus according to an embodiment of the present invention.

FIG. 30 is a block diagram showing the configuration of a display apparatus according to an embodiment of the present invention. Particularly, the diagram shows an example of the configuration of the network TV 1140 shown in FIG. 29.

Referring to FIG. 30, other than the function of receiving contents through a network, the network TV 1140 may be provided with a function of receiving RF signal type broadcast signals by wireless communication or through a cable, using a broadcast receiver 1141.

The network TV 1140 may include the broadcasting receiver 1141, a demultiplexer 1142, a video signal processor 1143, a display 1144, a network interface 1145, an OSD generator 1146, a user input unit 1147, a storage unit 1148, a memory 1149, and a controller 1150.

The broadcast receiver 1141, demultiplexer 1142, and video signal processor 1143 can constitute one broadcast process unit that receives broadcast signals and processes them into a type which can be outputted to the display 1144, by performing various processes.

When contents are provided by digital broadcasting, digital broadcast signals may be transmitted in transport stream types packeted by time-division multiplexing video signals, audio signals, and addition data.

Further, the broadcast receiver 1141 may include an antenna for receiving broadcast signals transmitted from the outside, and may also include one or more tuners that tune a broadcast signal having a corresponding frequency band in accordance with a tuning control signal of the controller 1150, which is described below, and a demodulator that outputs the broadcast signal of a predetermined tuned channel by performing a VSB (Vestigial Sideband) modulating process and an error correcting process to the broadcast signal.

Further, the broadcast signal received by the broadcast receiver 1141 is divided into various additional data defined as a video signal, an audio signal, and a PSIP (Program and System Information Protocol) information, etc. by the demultiplexer 1142, and then outputted in a bit stream type.

The video data separated by the demultiplexer 1142 is processed by the video signal processor 1143 and displayed by the display 1144.

In this configuration, the video signal processor 1143 includes an MPEG-2 decoder and a scaler that converts the video data to meet vertical frequency, resolution, picture ratio, etc., corresponding to output standards of the display 1144.

Additional data included in the additional data separated by the demultiplexer 1142 can be stored in the memory 1149 and the memory 1149 can be implemented by an EEPROM (electrically erasable programmable read-only memory) or other known means.

The user input unit 1147 can be a means for receiving a request instruction from a user and generally can include an infrared receiving unit that receives an infrared signal inputted by a remote controller or a local key input unit disposed at one side of a panel.

The network interface 1145 can receive data or contents from the contents provider or the network operator 1110 through the network, and for example, can receive contents, such as broadcasting, games, VOD, and broadcasting signals, and related information, which are provided from the contents provider through the network. Further, it also receives the updated information of a firmware and updated information which the network operator 1110 provides through the network interface 1145.

The OSD generator 1146 generates a menu picture for receiving the user's determination signal in an OSD (On Screen Display) type. For example, the OSD generator 1146 can display the contents received through the network interface 1145 and the associated information through the display.

The controller 1150 may control the entire operation according to instructions inputted from the user input unit 11147 and can receive and execute software of the contents provider 1120 which is received from the network operator 1110, e.g., the update files of the firmware.

Figure 31:
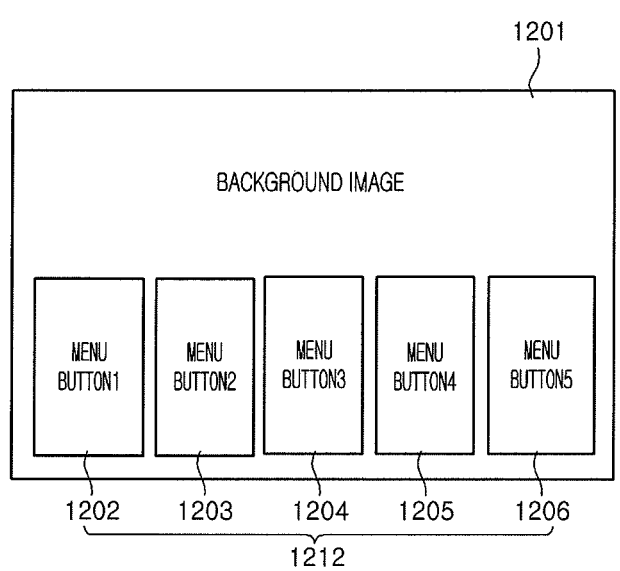
FIG. 31 is a diagram showing an embodiment of the configuration of a menu displayed on the screen of a display apparatus.

FIG. 31 is a diagram showing an embodiment of the configuration of a menu displayed on the screen of a display apparatus such as the network TV 1140.

Referring to FIG. 31, the menus of the network TV 1140 may include a background image 1201 and menu buttons 1212 indicating a plurality of contents providers.

The menu buttons 1212 displayed in the background image 1201 may represent buttons for connecting to the contents providers' servers and a user can be provided with contents services by selecting one of the menu buttons 1212 to be connected to the contents providers' servers.

According to an embodiment of the present invention, at least one of the contents providers provide video communication services, and accordingly, any one of the menu buttons in the menu of the network TV 1140, for example, a menu button 4 1205 may be a button corresponding to the video communication service.

The user can be connected to the server of the contents provider providing video communication service(s) by selecting the menu button 4 1205 in the menu buttons 1212 on the menu.

Meanwhile, it is possible to perform a method for connecting video communication according to an embodiment of the present invention which is described with reference to FIGS. 2 to 28, after being connected to the server of the contents provider providing the video communication service(s) in the methods described above.

Further, at least some steps in the methods of connecting video communication described with reference to FIGS. 2 to 18 may be performed in the server of the contents provider 1120, the service provider 1130, and/or the network operator 1110.

Further, the methods of connecting video communication according to the embodiments of the present invention for a video call may be programmed to be executed by a computer and stored in a computer-readable recording media, in which the computer-readable recording media may be ROM, RAM, CD-ROM, magnetic tape, floppy disc, DVD, and optical data storage, and may be implemented in a carrier wave type (e.g. transmitted by the internet).

Further, the computer-readable recording media may be distributed on computer systems connected through the network, and thus the computer-readable recording media may be stored and executed as the computer-readable codes by a distribution scheme. Further, functional programs, codes, and code segments for implementing a method of receiving broadcast can be easily inferred by programmers in the related art.

Although preferred embodiments of the present invention have been illustrated and described, the present invention is not limited to the above-mentioned embodiments and various modifications can be made by those skilled in the art without the scope of the appended claims of the present invention. In addition, these modified embodiments should not be appreciated separately from technical spirits or prospects.

What is claimed is:

1. A method for switching video communication from a first device to at least one external device, the method comprising:
receiving, by the first device, video data of a video call from a second device;
displaying, by the first device, a switch button for switching the video call received from the second device to at least one external device on a screen according to the receiving of the video data of the video call from the second device;

receiving, by the first device, a first request for selecting the switch button on the screen;

displaying, by the first device, a list including a plurality of images and a distance between the first device and each of a plurality of external devices according to the received first request, wherein the plurality of images corresponds to a plurality of external devices that are configured to take on a video call operation;

receiving, by the first device, a second request for selecting a first external device from among the plurality of external devices; and transmitting, by the first device, the video data of the video call received from the second device to the selected first external device according to the received second request.

2. The method according to claim 1, wherein the at least one external device is received from a server.

3. The method according to claim 1, further comprising:
receiving a third request for switching the video call from the first external device to a second external device,
wherein the second external device can perform the video call operation.

4. The method according to claim 3, further comprising:
ending, by the first device, a communication of the video call operation with the first external device in response to the request for switching the video call to the second external device;
establishing a video call operation session with the second external device; and
transmitting, by the first device, at least one of the audio and video data of the video call received from the second device to the second external device through the established video call operation session.

5. The method according to claim 3, further comprising:
receiving at least one of audio and video data according to a user's input from the first and second external devices; and
synchronizing the audio and video data received from the first and second external devices; and
transmitting the synchronized data to the second device.

6. The method according to claim 1, further comprising:
pre-registering, in the first device or a server, at least one external device to which the video call operation of the first device can be switched.

7. A first device for switching video communication to at least one external device, the first device comprising:
a display unit;
a communication unit configured to receive a video call from a second device;
a user interface configured to receive a request for switching the video call to an external device; and
a controller coupled with the display unit, the communication unit and the user interface unit,
the controller is configured to:
receive video data of the video call from the second device,
display a switch button for switching the video call received from the second device to at least one external device,
receive a first request for selecting the switch button on a screen,
display a list including a plurality of images and a distance between the first device and each of a plurality of external devices according to the first request, wherein the plurality of images corresponds to a plurality of external devices that are configured to take on a video call operation,
receive a second request for selecting a first external device from among the plurality of external devices, and
transmit the video data of the video call received from the second device to the selected first external device according to the second request.

8. The first device according to claim 7, wherein the controller obtains the at least one external device from a server.

9. The first device according to claim 7, wherein the user interface is further configured to:
receive a third request for switching the video call from the first external device to a second external device,
wherein the second external device can perform the video call operation.

10. The first device according to claim 9, wherein the controller is further configured to:
end a communication of the video call operation with the first external device in response to the request for switching the video call to the second external device;
establish a video call operation session with the second external device; and
transmit, through the communication unit, at least one of the audio and video data of the video call received from the second device to the second external device through the established video call operation session.

11. The first device according to claim 9, wherein the controller further is configured to:
receive at least one of audio and video data according to a user's input from the first and second external devices; and
synchronize the audio and video data received from the first and second external devices and transmit, through the communication unit, the synchronized data to the second device.

12. The first device according to claim 7, the controller further configured to:
pre-register at least one external device to which the video call operation of the first device can be switched.

13. A method for switching video communication from a first device to an external device, the method comprising:
receiving, by the first device, video data of a video call from a second device;
displaying, by the first device, a switch button for switching the video call received from the second to the external device;
receiving a first request for selecting the switch button;
displaying, by the first device, list including a plurality of images and a distance between the first device and each of a plurality of external devices according to the first request, wherein the plurality of images corresponds to a plurality of external devices that are configured to take on a video call operation;
receiving a second request for selecting a first external device from among the displayed at least one external device; and
transmitting, by the first device, the video data of the video call received from the second device to the selected first external device according to the second request.

* * * * *